July 10, 1945.  G. FOX  2,379,958
SKIP HOIST CONTROL
Filed Dec. 11, 1942  12 Sheets-Sheet 1
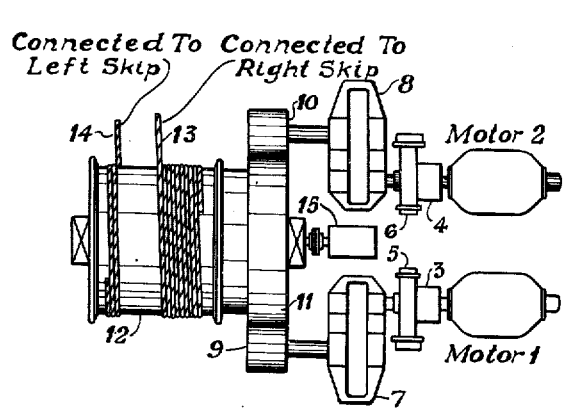
Fig. 1
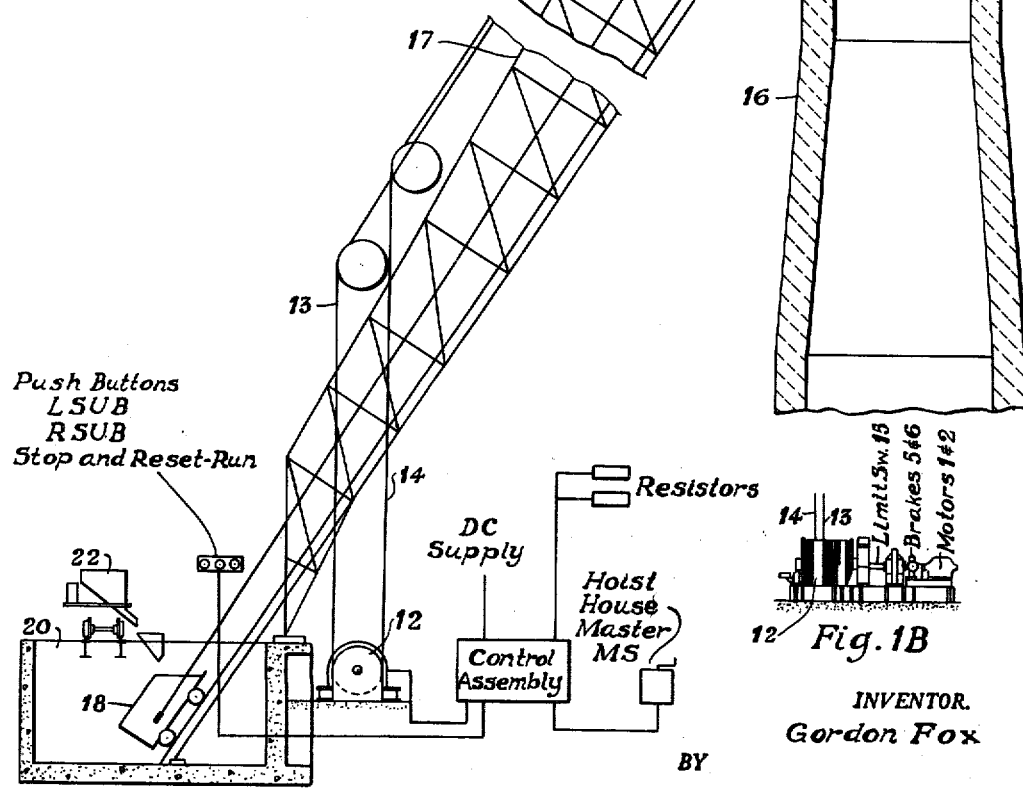
Fig. 1A
Fig. 1B
INVENTOR.
Gordon Fox July 10, 1945.  G. FOX  2,379,958
SKIP HOIST CONTROL
Filed Dec. 11, 1942   12 Sheets-Sheet 2
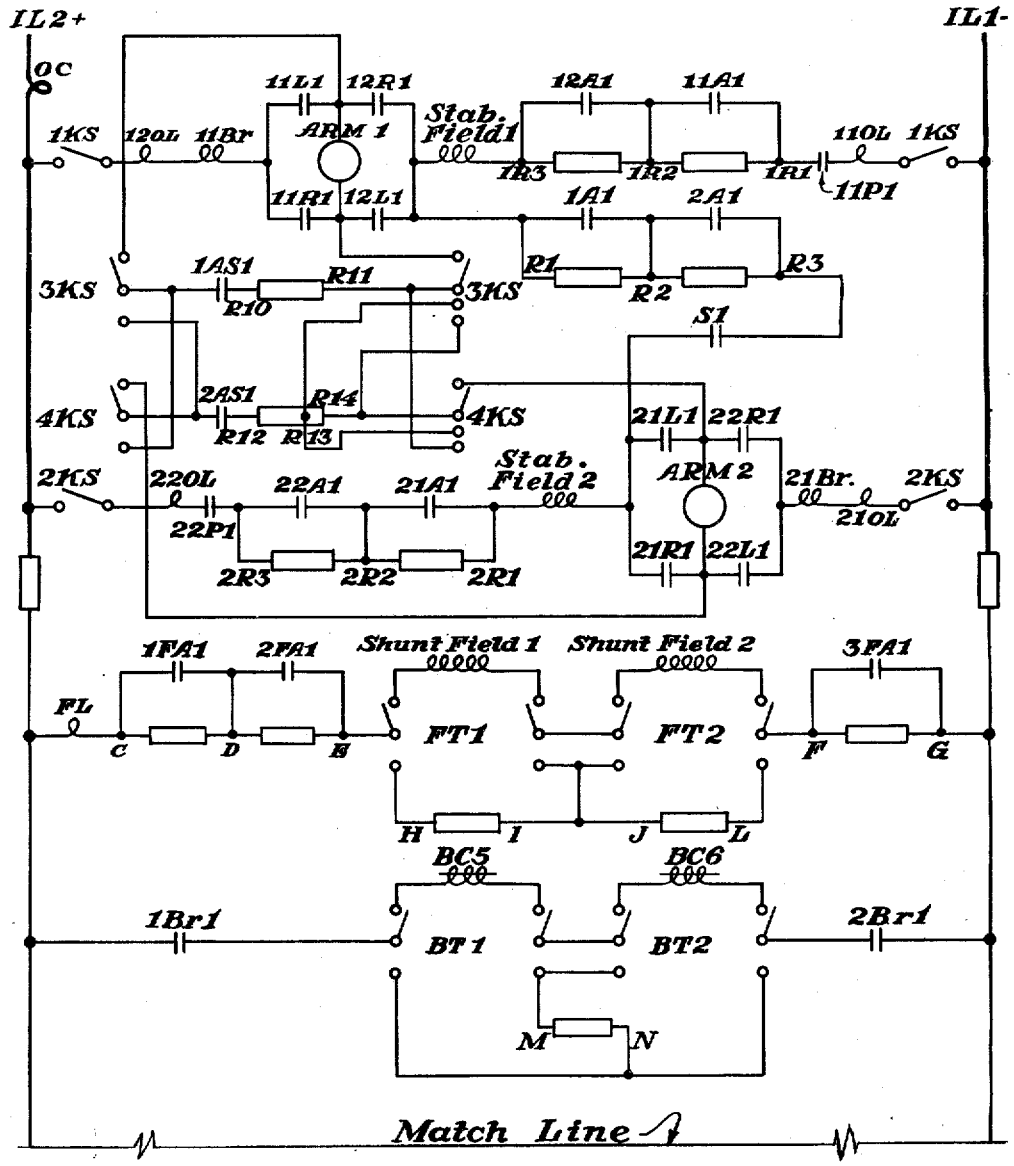
Fig 2   Part A
INVENTOR.
Gordon Fox
BY
Wilkinson, Huxley, Byron & Knight
Attys

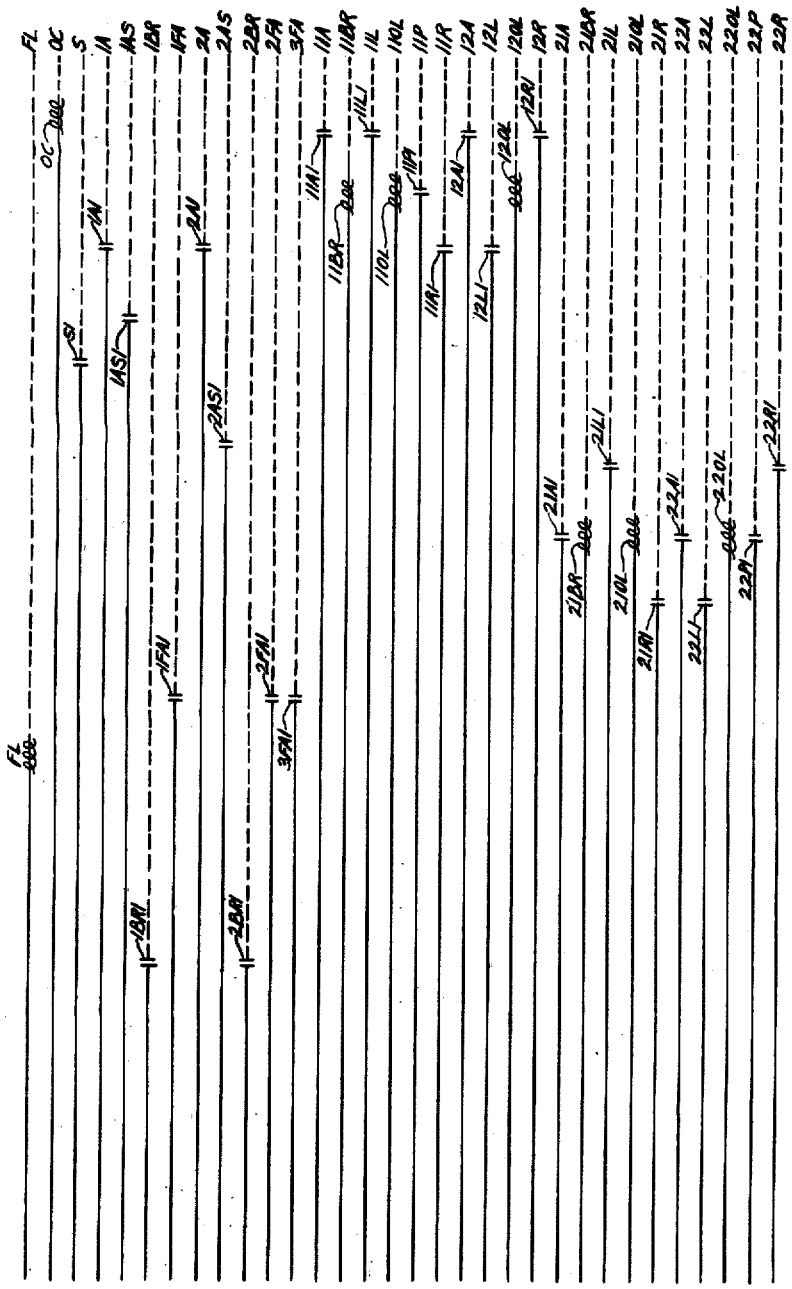
Fig. 2 - Part A-1

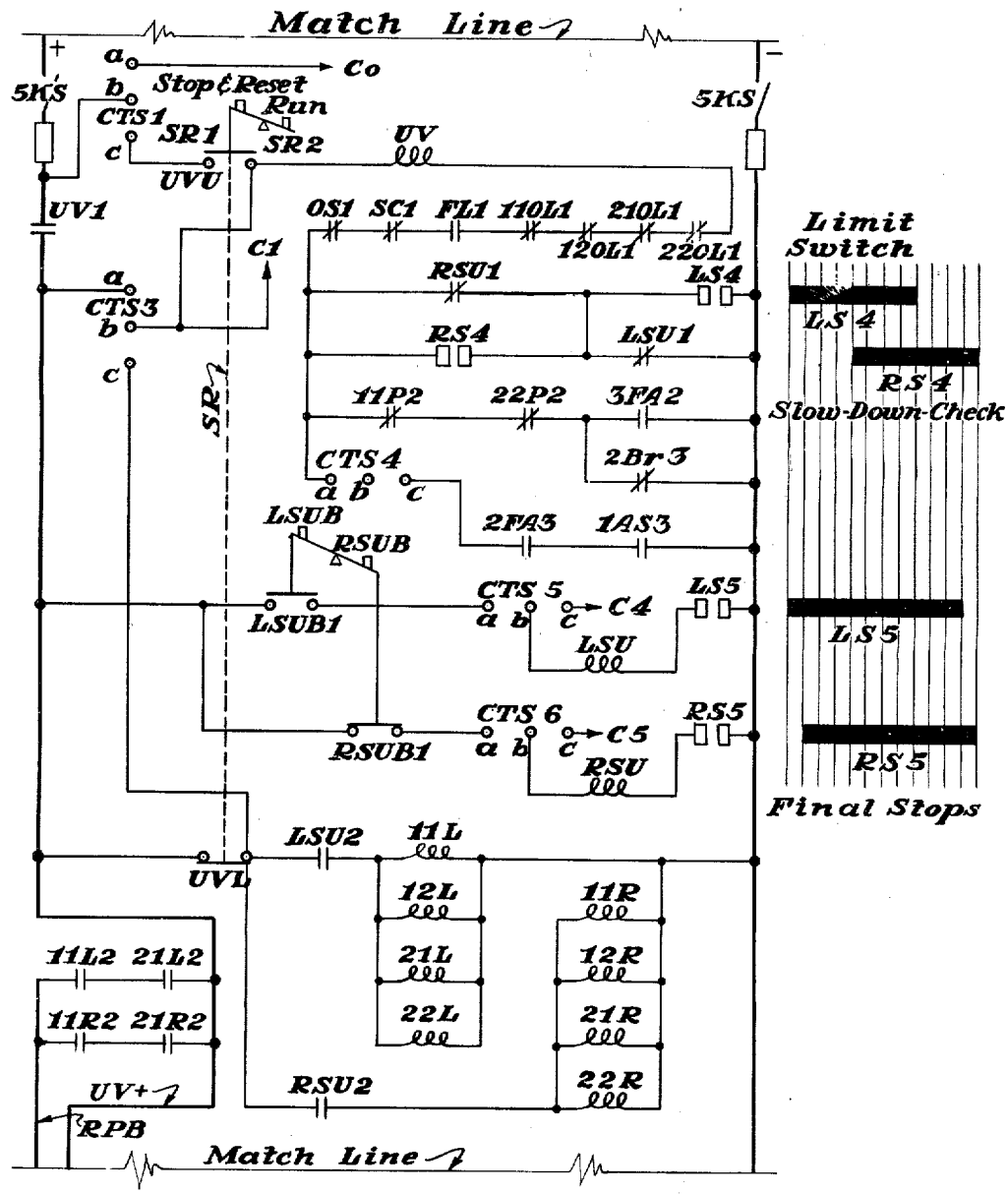
Fig. 2 - Part B

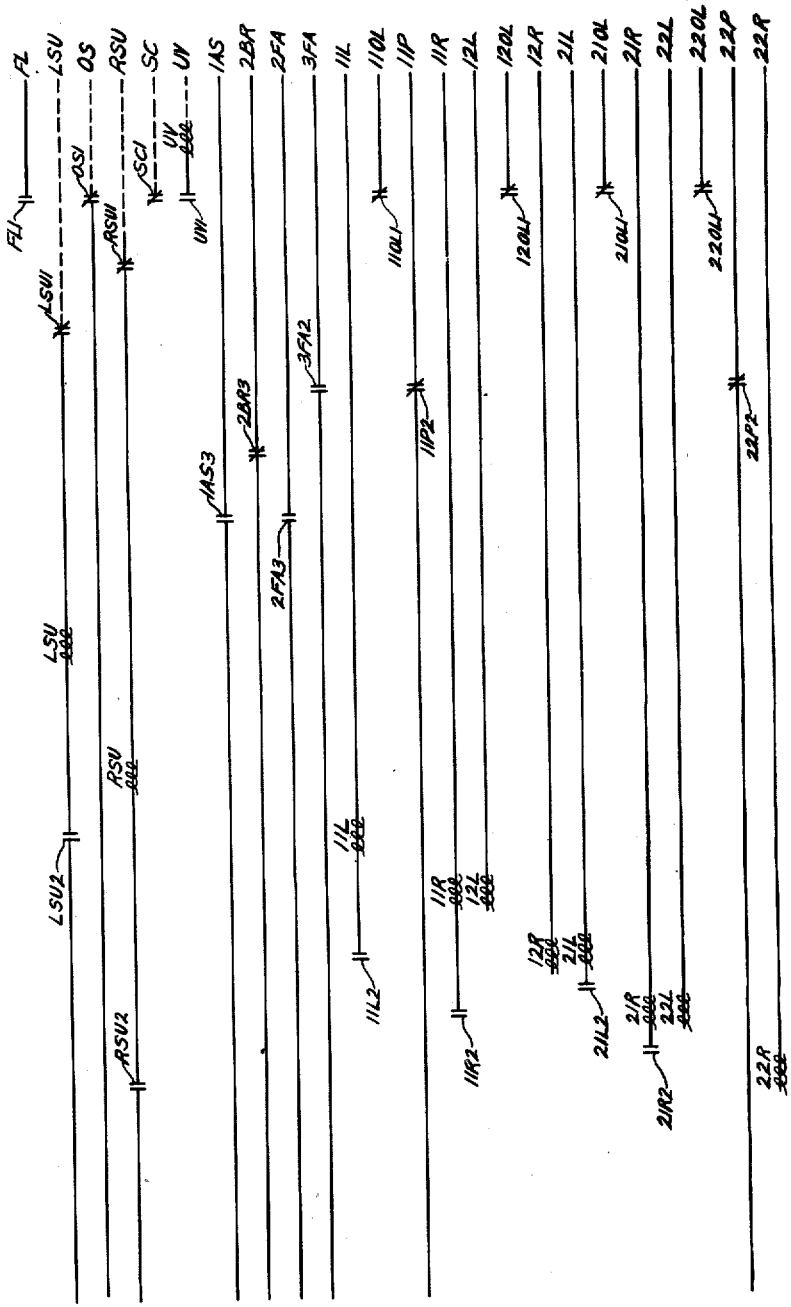
FIG. 2 - PART B-1

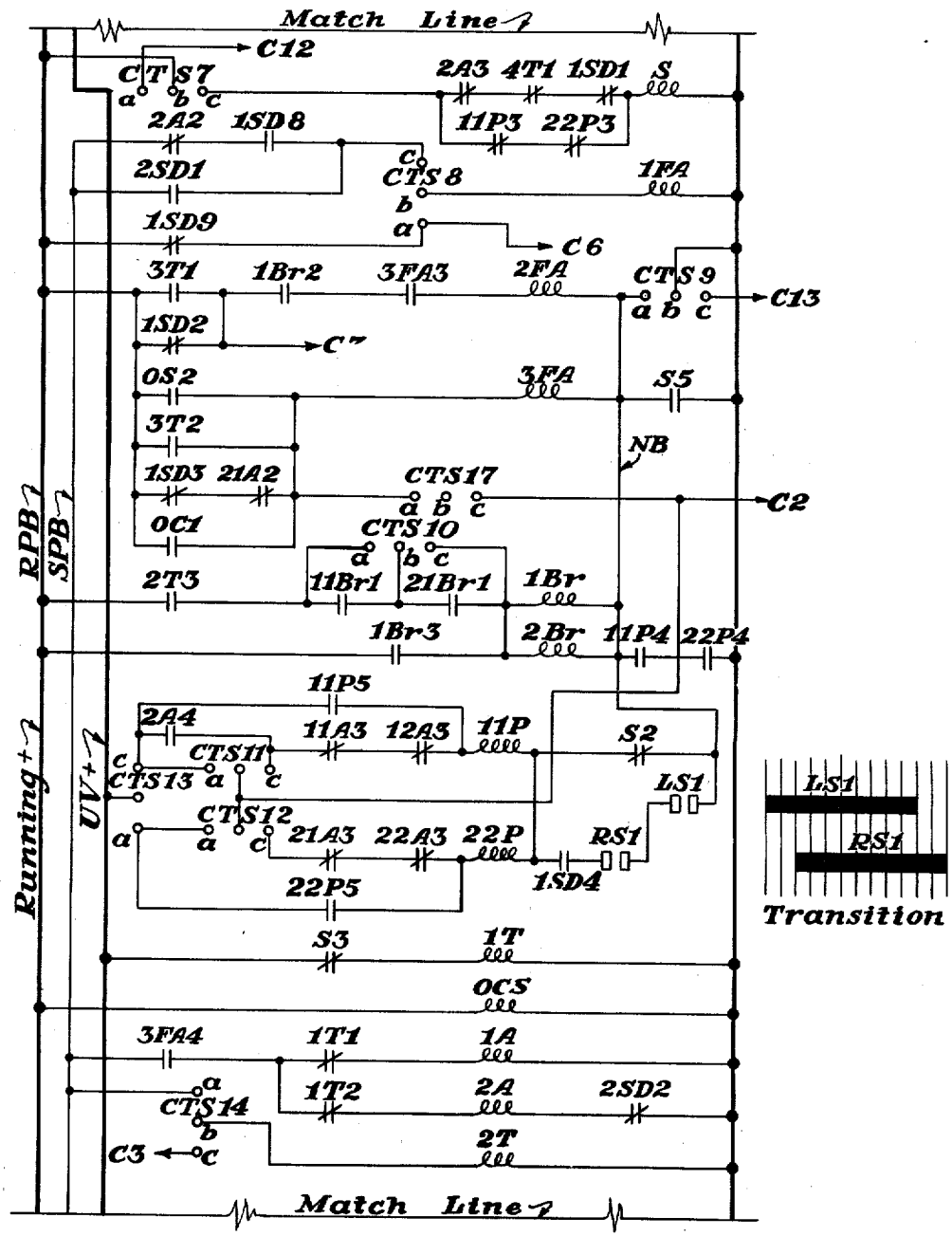
Fig. 2 – Part C

July 10, 1945. G. FOX 2,379,958
SKIP HOIST CONTROL
Filed Dec. 11, 1942 12 Sheets-Sheet 7
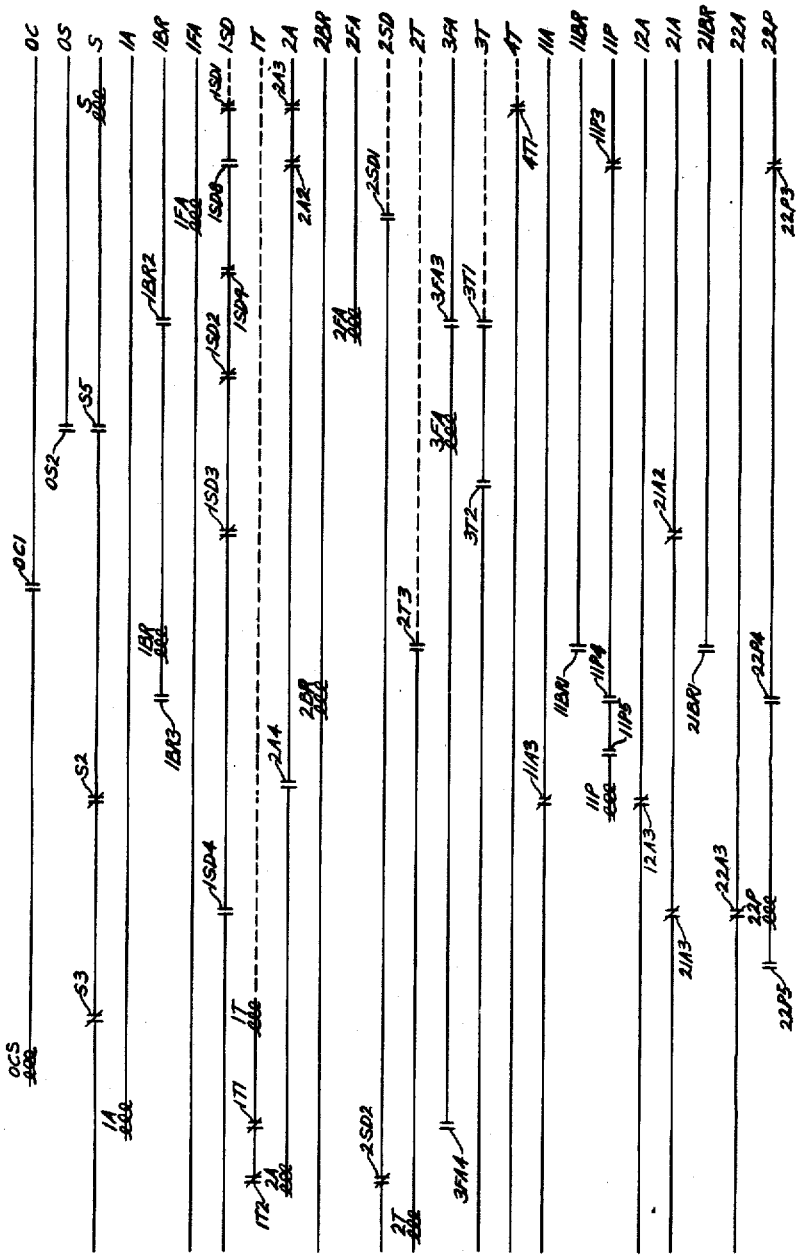
FIG. 2 - PART C-1
INVENTOR.
Gordon Fox
BY July 10, 1945.　　　　　G. FOX　　　　2,379,958
SKIP HOIST CONTROL
Filed Dec. 11, 1942　　　12 Sheets-Sheet 8
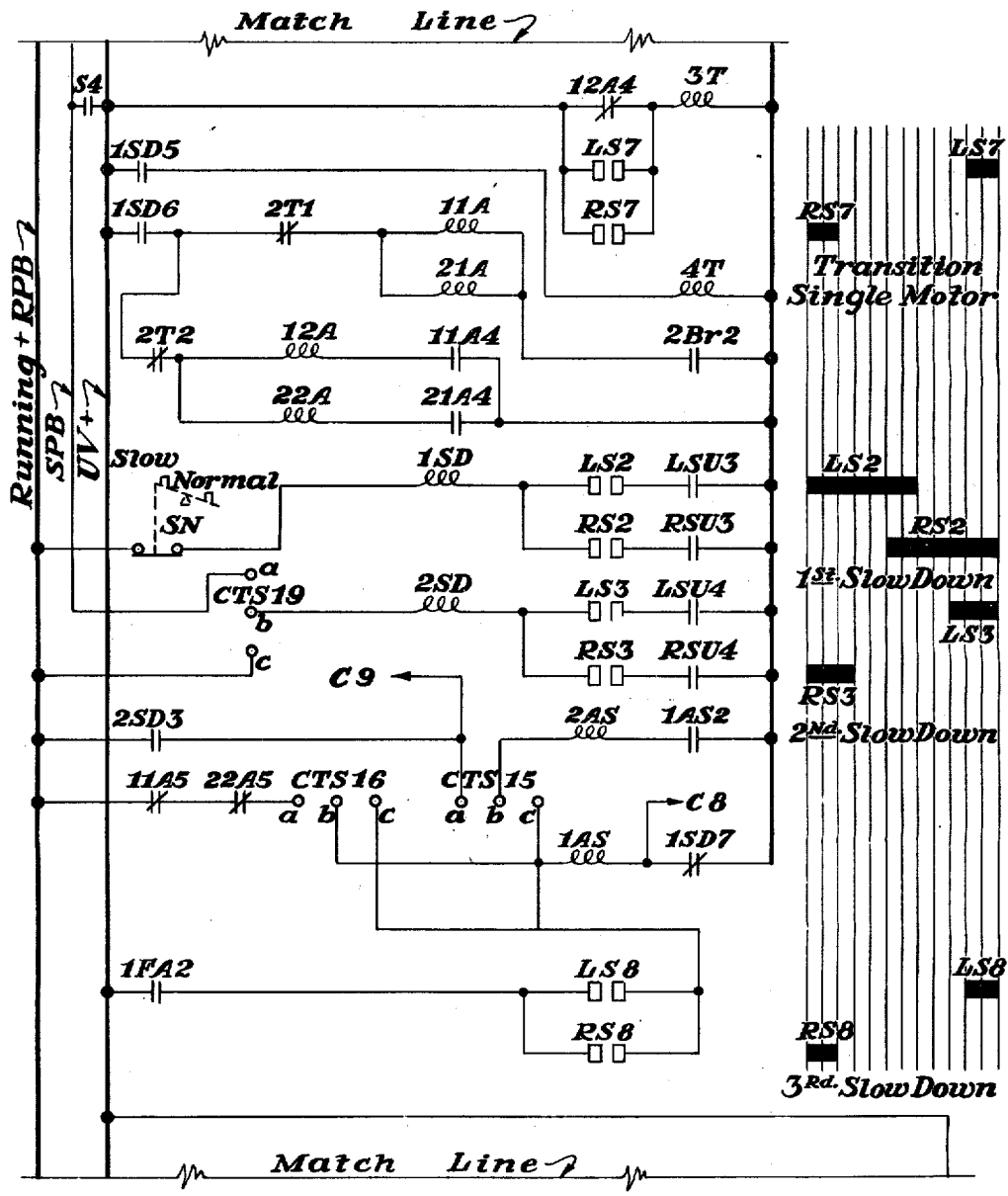
Fig. 2 — Part D
INVENTOR.
Gordon Fox
BY July 10, 1945.  G. FOX  2,379,958
SKIP HOIST CONTROL
Filed Dec. 11, 1942  12 Sheets-Sheet 9
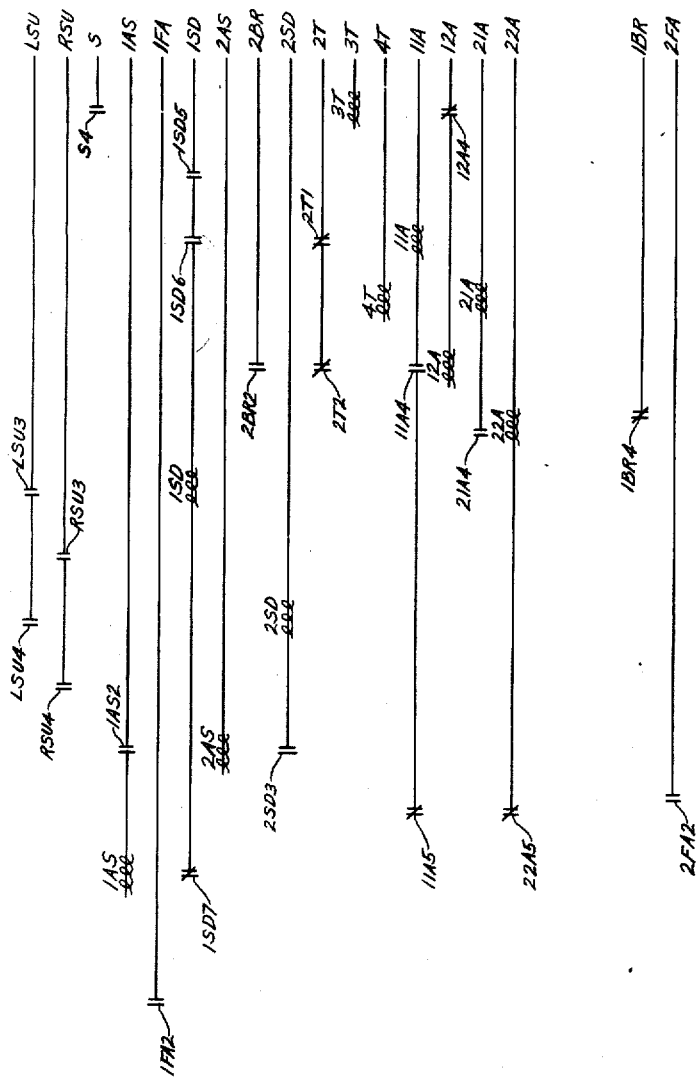
FIG. 2 - PART D-1  FIG. 2 - PART E-1
INVENTOR.
Gordon Fox
BY
Attys

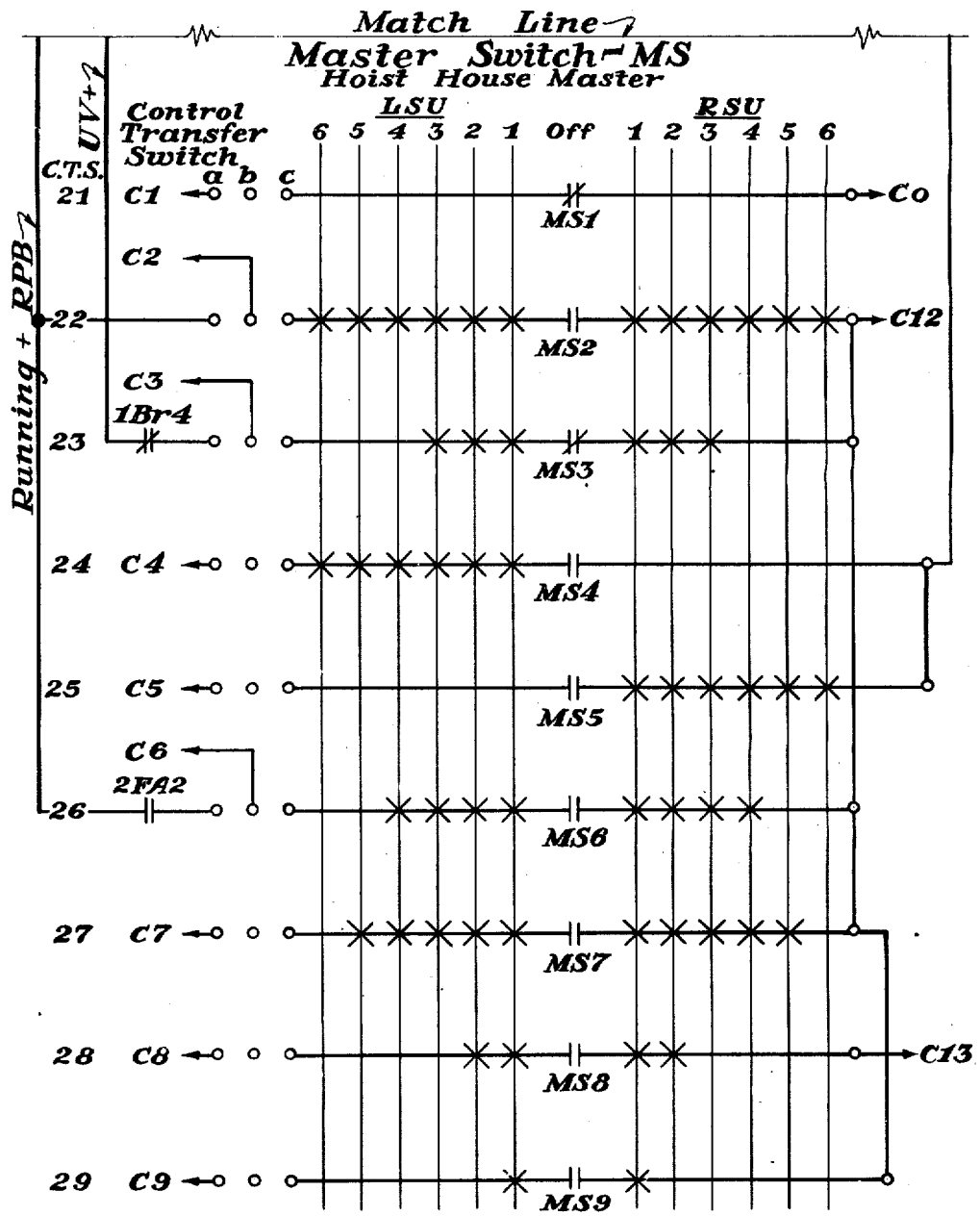
Fig. 2-Part E

July 10, 1945.  G. FOX  2,379,958
SKIP HOIST CONTROL
Filed Dec. 11, 1942   12 Sheets-Sheet 11

Control Transfer Switch

| C.T.S | Switch | | Motor 1 Hoist House | Motor 1 Stock House | Two Motor | Motor 2 Stock House | Motor 2 Hoist House |
|---|---|---|---|---|---|---|---|
| 1 | a b c | a-b | X | — | — | — | X |
|   |   | b-c | — | X | X | X | — |
| 3 |   | a-b | — | X | X | X | — |
|   |   | b-c | X | — | — | — | .X |
| 4 |   | a-b | X | X | — | X | X |
|   |   | b-c | X | X | — | X | X |
| 5 |   | a-b | — | X | X | X | — |
|   |   | b-c | X | — | — | — | X |
| 6 |   | a-b | — | X | X | X | — |
|   |   | b-c | X | — | — | — | X |
| 7 |   | a-b | X | — | — | — | X |
|   |   | b-c | — | — | X | — | — |
| 8 |   | a-b | X | X | — | X | X |
|   |   | b-c | — | — | X | — | — |
| 9 |   | a-b | X | X | — | X | X |
|   |   | b-c | X | — | — | — | X |
| 10 |   | a-b | — | — | — | X | X |
|   |   | b-c | X | X | — | — | — |
| 11 |   | a-b | X | X | — | — | — |
|   |   | b-c | X | X | X | — | — |
| 12 |   | a-b | — | — | — | X | X |
|   |   | b-c | — | — | X | X | X |
| 13 |   | a-b | — | — | X | — | — |
|   |   | b-c | — | — | X | — | — |
| 14 |   | a-b | — | — | X | — | — |
|   |   | b-c | X | X | — | X | X |
| 15 |   | a-b | X | X | — | X | X |
|   |   | b-c | — | — | X | — | — |
| 16 |   | a-b | X | X | — | X | X |
|   |   | b-c | — | — | X | — | — |
| 17 |   | a-b | X | X | — | X | X |
|   |   | b-c | X | X | — | X | X |
| 19 |   | a-b | — | — | X | — | — |
|   |   | b-c | X | X | — | X | X |

*Fig. 3—Part A*

INVENTOR.
Gordon Fox
BY
Wilkinson, Huxley, Byron & Knight
attys

July 10, 1945.  G. FOX  2,379,958
SKIP HOIST CONTROL
Filed Dec. 11, 1942  12 Sheets-Sheet 12

Control Transfer Switch-(Continued)

| C.T.S. | Switch | | Motor 1 Hoist House | Motor 1 Stock House | Two Motor | Motor 2 Stock House | Motor 2 Hoist House |
|---|---|---|---|---|---|---|---|
| 21 | | a-b | × | — | — | — | × |
|    | | b-c | × | — | — | — | × |
| 22 | | a-b | — | × | — | × | — |
|    | | b-c | × | — | — | — | × |
| 23 | | a-b | — | × | — | × | — |
|    | | b-c | × | — | — | — | × |
| 24 | | a-b | × | — | — | — | × |
|    | | b-c | × | — | — | — | × |
| 25 | | a-b | × | — | — | — | × |
|    | | b-c | × | — | — | — | × |
| 26 | | a-b | — | × | — | × | — |
|    | | b-c | × | — | — | — | × |
| 27 | | a-b | × | — | — | — | × |
|    | | b-c | × | — | — | — | × |
| 28 | | a-b | × | — | — | — | × |
|    | | b-c | × | — | — | — | × |
| 29 | | a-b | × | — | — | — | × |
|    | | b-c | × | — | — | — | × |

× Signifies Circuit Closed

Fig. 3 - Part B

INVENTOR.
Gordon Fox

Patented July 10, 1945

2,379,958

UNITED STATES PATENT OFFICE 2,379,958

SKIP HOIST CONTROL

Gordon Fox, Chicago, Ill., assignor to Freyn Engineering Company, Chicago, Ill., a corporation of Maine Application December 11, 1942, Serial No. 468,698

33 Claims. (Cl. 172—152)

The present invention relates to improvements in skip hoist controls.

More particularly the present invention relates to improvements in the control method and mechanism for the motors of a skip hoist such as used in the charging of a blast furnace.

There are advantages in providing two motors for a skip hoist, the two motors being geared up to winding drum means for controlling the two cables connected to the two skips.

The normal operation of such a system is, of course, a two-motor operation. According to the present invention the two motors are started by connecting them initially in series, then in parallel. Further acceleration to the full running speed may be accomplished by weakening the shunt fields of the motors. As the skips approach the limit of travel, the speed is reduced by a generally inverse sequence of events prior to stopping.

Speaking generally, there are three major steps of operation:

1. Motors in series with forced fields.
2. Motors in parallel.
3. Motors operating with weakened fields.

In blast furnace operation, in accordance with the present invention, an operator at the stock house normally controls the starting of the skip hoist motors. However, this operator is not given full control of the functioning of the motors. According to the present invention the normal operation of the hoist through its cycle is automatic, the set-up being prearranged in the hoist house. In general, the operator in the stock house acts only to start the hoisting cycle.

There are times, however, when control of starting and stopping and speed of the motors should be centered at the hoist house, as for example when it is necessary to make adjustments or to otherwise service the mechanism. Accordingly, the present invention contemplates means whereby an operator in the hoist house may assume control over the starting and stopping of the motors as well as the speed thereof. The arrangement is such that the operator in the hoist house can operate the hoist with either motor individually. The present disclosure does not make provision for operating the skip hoist with two motors when controlled from the hoist house, for reasons of simplicity, and for the further reason that ordinarily operations requiring control at the hoist house are carried on only when the hoist is not handling regular loads.

According to the present invention, options are afforded to operate the hoist with either two motors or one motor. This provides for emergency operation in the event of failure of either motor or an associated portion of the control. These options are obtained, so far as the main motor circuits are concerned, by means of switches in the main motor circuits, the shunt field circuits of the motors, and the brake circuits. Various combinations of main circuits can be obtained by placing these several switches in their selective positions. Preferably said switches are all located in the hoist house.

The present invention contemplates means, referred to in this specification as a control transfer switch, in the hoist house for prearranging a large number of control circuits for accomplishing a prearranged sequence of events in the operation of the motors, or either of them, and their associated parts. According to the illustrated embodiment of the present invention, the control transfer switch has five alternative operating positions, which permit the selection of five ways of operating the control mechanism according to the following alternatives:

(a) The hoist can be driven by motor No. 1 only, controlled at the hoist house.

(b) The hoist mechanism may be driven by motor No. 1 only, controlled at the stock house.

(c) The hoist mechanism may be driven by both motors cooperating, controlled at the stock house, i. e., by an operator at the stock house.

(d) The hoist mechanism may be driven by motor No. 2 only, controlled from the stock house.

(e) The hoist mechanism may be driven by motor No. 2 only, controlled from the hoist house.

The control transfer switch must effect changes in a multiplicity of control circuits. This is done by combining many small switches in a mechanism adapted to change all of the circuits simultaneously. By positioning this control transfer switch in any one of the five alternative operating positions, it is possible to effect five combinations of a multiplicity of circuits. The positioning of the control transfer switch in any one of the five alternative operative positions mentioned accomplishes the opening and closing of a multiplicity of small switches in a large number of circuits to cause the rearrangement of these circuits, to accomplish the required sequence of events in the operation of the motor, or motors, in circuit.

In other words, considering operation in the stock house, if the control transfer switch is in a position corresponding to alternative (b), (c) or (d) above, combinations of circuits are set up whereby the operator in the stock house, by the mere pressing of a button or the like, can institute a cycle of operations which will follow through automatically. On the other hand, if the control transfer switch is in position corresponding to alternative (a) or (e), according to which control is transferred to the hoist house, the operator in the hoist house may start or stop or reverse the corresponding motor and control thereof by operating a master switch. The controls are such that when the control transfer switch is in position corresponding to alternative (a) or (e), the operator in the stock house has no control over the operation of the system (except to stop the hoist in emergency).

Ordinarily, skip hoists are counterbalanced in a substantial degree, since one skip is descending while the other skip ascends. The descending skip acts as a counterweight for the ascending skip, so that it is necessary for the motor to hoist only the net load of material. However, at the time that one skip is started out of the skip pit, the other skip at the top of the furnace is capsized and is in such a position that its weight is not effective as a counterweight. At such time the motor must develop enough torque to hoist the weight of the skip in the pit plus the weight of the material, plus the weight of the cable, without the assistance of the counterweight effect of the skip at the top of the hoist. Moreover, there must be some additional torque capacity in the motor to permit acceleration under these conditions. The torque necessary to start and accelerate a normal ore load is likely to be about 2.5 times the running torque required for such load.

It is customary to provide skips of sufficient volumetric capacities to handle coke charges of desired weights. It is customary to fill these skips only partially with ore for the ore charges. In many instances the ore charge is of a magnitude of half a skipload. However, it is entirely possible that the skip may be entirely filled with ore on some occasions, and it is desirable that the hoist be able to handle the skip in such event. The torque required to start a full skipload of ore out of the skip pit may be as much as three or four times the running torque associated with hoisting a normal ore load, and perhaps six or seven times the running torque required to hoist a coke load. Similarly, it is several times the torque corresponding to the root mean square load for the entire charging cycle.

Since starting torque is the determining factor, it is logical that the drive should be selected with particular reference to this requirement. Accordingly, in the practice of the present invention it is preferred that the hoist have the following basic characteristics, with particular reference to starting torque:

1. Through the use of field forcing and field weakening, in combination, the torque capacity of the motors at low speed is about twice their torque capacity at maximum speed.

2. Since the choice of the gear ratio between the motors and the hoisting drum is determined by the desired running speed, and since this running speed is much above the base speed of the motor, a gear ratio on the order of 40 to 1 or 50 to 1 is preferred. As contrasted with the ratio usual in prior art, approximately 25 to 1, the starting torque at the winding drum shaft is approximately doubled in relation to a given torque development at the motor shaft.

An object of the present invention is to provide an installation involving skip hoist motors and control mechanism therefor for automatically obtaining a wide speed range for starting running and dumping, with a minimum use of resistors in the circuits of said motors.

A further object is to provide a drive mechanism and associated control mechanism for a skip hoist in which the loss of power in resistors is reduced to a minimum.

A further object is to provide a drive mechanism and control mechanism associated therewith for a blast furnace skip hoist in which the inherent torque capacity in the equipment is advantageously proportioned and related to the drive requirements.

A further object is to provide a drive mechanism and control mechanism therefor in a blast furnace skip hoist wherein the running horse power requirements and the starting torque requirements are so related that motors of minimum size may be employed.

A further object is to provide a drive mechanism and associated control mechanism for a blast furnace skip hoist employing two motors wherein the motor capacities are utilized to the best advantage.

A further object is to provide a drive mechanism and associated control for a blast furnace skip hoist in which the demands upon the electric power supply system are relatively moderate.

A further object is to provide an improved drive mechanism and associated control mechanism for a blast furnace skip hoist employing two duplicate motors, wherein the motors have compound-wound motor characteristics during one portion of the operating cycle and shunt-wound characteristics during another portion thereof.

A further object is to provide drive mechanism and control therefor for operation of a skip hoist, in which the speed when dumping a skip will be uniform and will be independent of the weight of material handled in the skips.

A further object is to provide drive mechanism and control therefor for a skip hoist, wherein a failure of a coil of a contactor in a motor circuit will not jeopardize the hoist.

A further object is to provide mechanism for driving and controlling a skip hoist, wherein the hoist speed is automatically reduced when the hoist tends to run at a speed in excess of normal.

A further object is to provide mechanism for driving and controlling a skip hoist, wherein the hoist speed is automatically reduced when the load exceeds a predetermined amount.

A further object is to provide mechanism for driving and controlling a skip hoist, wherein slow-down, as the end of travel is approached, is insured by an independent check on the operation of the automatic means provided to cause such slow-down.

A further object is to provide mechanism for driving and controlling a skip hoist employing two duplicate motors wherein either motor may be employed singly to handle more than half of the rated capacity of the hoist without exceeding the motor size suitable for normal two-motor operation.

A further object is to provide mechanism for driving and controlling a skip hoist employing two duplicate motors, wherein the operating speed with single motor drive may be substantially less than that employed with normal two-motor drive.

A further object is to provide mechanism for driving and controlling a skip hoist employing two duplicate motors, wherein the motors may be operated at relatively high speed and a relatively high gear ratio may be employed between the motors and the hoist drum.

A further object is to provide mechanism for driving and controlling a skip hoist employing two duplicate motors, wherein the division of load between the two motors when operating in parallel at full speed is insured without prejudice to close speed regulation of the motors when operating in series at dumping speeds.

A further object is to provide mechanism for driving and controlling a skip hoist employing two motors, wherein the same armature shunting resistors and contactors are employed to meet the differing requirements of two-motor and/or single-motor operation.

A further object is to provide mechanism for driving and controlling a skip hoist employing two duplicate motors which provides for full automatic operation of both motors or with either individual motor in response to one master means, and provides for control of operation with either individual motor in response to another master means.

A further object is to provide mechanism for driving and controlling a blast furnace skip hoist which combines reliability and flexibility with simplicity.

A further object is to provide mechanism for driving and controlling a skip hoist which will afford smooth operation.

A further object is to provide a skip hoist drive involving a hoisting drum and a motor, wherein a brake associated with the motor shaft exerts a relatively powerful effect at the hoisting drum shaft.

A further object is to provide mechanism for driving and controlling a skip hoist well adapted to meet the needs of commercial operation.

Further objects will appear as the description proceeds.

Referring to the drawings—

Figure 1 is a diagrammatic view illustrating a winding drum for operating the two cables of a double skip hoist, said winding drum having associated therewith the limit switch, the driving motors, brakes and gearing for controlling said winding drum;

Figure 1A is a diagrammatic view illustrating a blast furnace and an incline, skips and a hoist associated therewith;

Figure 1B is a diagrammatic view illustrating in side elevation the association of a winding drum and the limit switch, brakes and the motors associated therewith;

Figure 2 is an electrical diagram which for convenience is divided into five parts, indicated as Figure 2, part A; Figure 2, part B; Figure 2, part C; Figure 2, part D; and Figure 2, part E;

Figure 2, part A—1, Figure 2, part B—1, Figure 2, part C—1, Figure 2, part D—1, and Figure 2, part E—1, are diagrams explanatory of Figure 2, part A, Figure 2, part B, Figure 2, part C, Figure 2, part D, and Figure 2, part E, respectively; and Figure 3 is a reference chart indicating the operation of a control transfer switch constituting part of the present invention which figure for convenience is divided into two parts, to wit— part A and part B.

Description of instrumentalities

As illustrated in Figure 1, a pair of driving motors 1 and 2 is provided. Said motors 1 and 2 are connected through couplings 3 and 4, respectively, through brakes 5 and 6 to gear reduction units 7 and 8. The low-speed sides of said gear reduction units 7 and 8 are connected, respectively, to pinions 9 and 10, which mesh with the gear 11. Said gear 11 is rigidly secured to the drum 12, which has secured thereto the cables 13 and 14. Said cables 13 and 14 may be connected, respectively, to the right skip and the left skip of a blast furnace charging mechanism. It will be understood that when one or both of the motors 1—2 are energized to cause rotation of the winding drum 12 in one direction, one of the cables 13 will be wound up upon the drum 12, and the other of said cables will be paid off, and, conversely, when the energization of one or both of the motors 1—2 is such as to cause reverse rotation of the winding drum 12, the movements of said cables 13 and 14 will be reversed. Limit switch means connected to be driven in synchronism with the drum 12 are indicated diagrammatically by the numeral 15.

Referring to Figure 1A, the numeral 16 indicates a blast furnace and the numeral 17 indicates a skip incline associated with said blast furnace. Said skip incline is provided with a pair of skips 18 and 19, one of which is illustrated as being in the skip pit 20 and the other of which is indicated in capsized position for delivering material into the hopper 21 at the top of the blast furnace 16. The skip 18 is shown in position to receive material from the scale car 22. The cables 13 and 14 associated with the winding drum 12 are connected to the two skips 18 and 19, being trained over sheaves, which need not be described in detail.

A description of the electrical diagram in Figure 2 may be prefaced by a statement of the significance of the numerals and letters used thereon, as follows:

The numerals 11 and 12 appearing before upper case letters, as for example 11OL and 12OL, refer to instrumentalities particularly associated with motor No. 1.

The numerals 21 and 22 appearing before upper case letters, as for example 21OL and 22OL, refer to instrumentalities particularly associated with motor No. 2.

The letters OC refer to the operating coil and the contacts responsive thereto of a relay which functions in response to overcurrent.

The letters OL refer to the operating coils and the contacts responsive thereto of a relay responsive to overload.

The letters Br refer to one or both of the brakes associated with the motors.

The letter L in general refers to left skip.

The letter R refers in general to the right skip.

The letter A refers in general to accelerating contactors.

The letter P refers in general to parallel operation of the motors.

The letter S refers in general to series operation of the motors.

The letters R, as for example R1—R2, R10—R11, refer to resistors either in series or shunt relationship with the motor armatures.

The letters AS refer to the operating coil and contacts responsive thereto of armature shunting contactors.

The letters FA refer to the operating coil and contacts responsive thereto of field accelerating relays.

The letters FL refer to the operating coil and contacts responsive thereto of a field loss relay.

The letters FT refer to the transfer switch for the shunt field circuits.

The letters BT refer to the transfer switch for the brake coil circuits.

The letters A—B, B—C, etc., refer to resistors in shunt field circuits, brake circuits, and control or pilot circuits.

The letters UV refer to the operating coil and contacts responsive thereto of an under-voltage or low-voltage relay.

The letters SC refer to the operating coil and contacts responsive thereto of a slack cable relay.

The letters OS refer to the operating coil and contacts responsive thereto of an overspeed relay.

The letters CTS refer to a control transfer switch. This control transfer switch has a number of stages identified as CTS1, CTS2, etc.

The letters RSU refer to the coil and the contacts responsive thereto of a relay controlling the movement of the right skip up.

The letters LSU refer to the coil and the contacts responsive thereto of a relay controlling the movement of the left skip up.

The letters RS refer to the contacts of the right skip limit switch.

The letters LS refer to the contacts of the left skip limit switch.

The letters RSUB refer to a push button control for starting the right skip up.

The letters LSUB refer to a push button control for starting the left skip up.

The letter T refers to the coils and contacts responsive thereto of various timing relays.

The letters SD refer to slow-down, 1SD referring to first slow-down, and 2SD referring to second slow-down.

The letter C refers to conductors.

The letters SN refer to a "slow-down or normal" switch.

The letters MS refer to a master switch.

The diagrams in Figure 2, part A—1, Figure 2, part B—1, Figure 2, part C—1, Figure 2, part D—1 and Figure 2, part E—1, show designations of elements such as coils, contacts, et cetera, associated with the various instrumentalities, such as relays, et cetera, the vertical location of any coil, contact or the like corresponding approximately to the vertical location of this element in the corresponding part of Figure 2. The broken lines extending downwardly from the character representing each instrumentality lead to a designation of an element forming part of that instrumentality. A full line extending downwardly from a designation of an element indicates that there are other elements associated with that particular instrumentality. If no line extends downwardly from a designation of an element, no further elements are associated with that particular instrumentality. For example, considering the instrumentality having associated therewith the letters OC, it will be noted from Figure 2, part A—1, that this instrumentality includes an operating coil OC located a short distance from the top of the diagram represented as Figure 2, part A. The characters OC do not appear in the diagram Figure 2, part B—1, which indicates that no elements of the instrumentality OC appear in Figure 2, part B. Referring now to Figure 2, part C—1, under the heading OC, it will be noted that said instrumentality includes the contacts OC1 and the holding coil OCS. Inasmuch as no line extends downwardly from the characters OCS, there are no other elements embodied in the instrumentality OC in the remaining parts of Figure 2.

The character 1L2 indicates the positive main and the character 1L1 indicates the negative main of a source of constant potential direct current. Associated with said mains 1L2 and 1L1 are the running positive bus RPB (Fig. 2, parts C and D), the series positive bus SPB (Fig. 2, parts C and D), and the negative bus NB (Fig. 2, part C). The character Arm. 1 indicates the armature of the motor 1, and the character Arm. 2 indicates the armature of the motor 2.

Connected in series with the armature 1 is a series field winding indicated by the words "Stab. Fld. 1," meaning stabilizing field. Connected in series with the armature 2 is the series field winding indicated by the words "Stab. Fld. 2," also meaning stabilizing field. The words "Sh. Fld. 1" indicate a shunt field winding associated with the armature 1, and the words "Sh. Fld. 2" indicate the shunt field winding associated with the armature 2. By means of instrumentalities to be described, the connections to the armature 1, armature 2, "Sh. Fld. 1," "Sh. Fld. 2," the stabilizing (series) field windings and certain resistors may be controlled to provide the changes of speed and changes in direction of armature rotation required for operation of the skip hoist.

The character 1KS indicates a two-bladed single-throw knife switch.

The character 2KS indicates a two-bladed single-throw knife switch.

The character 3KS indicates a two-bladed double-throw knife switch, of which the right-hand blade when in its down position engages an intermediate contact.

The character 4KS indicates a two-bladed double-throw knife switch, of which the right-hand blade when in its down position engages an intermediate contact.

The character 5KS (Fig. 2, part B) represents a two-bladed single-throw knife switch in the electric mains.

The character FT1 (Fig. 1, part A) indicates a motor field transfer switch for controlling the connections of "Sh. Fld. 1" and embodies a double-pole double-throw knife switch.

The character FT2 (Fig. 1, part A) indicates a motor field transfer switch for controlling "Sh. Fld. 2" and embodies a double-pole double-throw knife switch.

When FT1 and FT2 are closed upwardly they connect "Sh. Fld. 1" and "Sh. Fld. 2" in series. When one or the other of said switches is closed downwardly, its corresponding shunt field winding is cut out of circuit and a resistor (to be referred to presently) is cut into circuit.

Character BT1 indicates a brake transfer switch for brake 5, embodying a double-pole double-throw knife switch.

The character BT2 indicates a brake transfer switch for brake 6 embodying a double-pole double-throw knife switch.

The character OC (Fig. 2, part A) represents the series coil of a relay, the contacts of which are designated OC1 (Fig. 2, part c). This same relay has a shunt coil OCS (Fig. 2, part c). The series coil OC functions to close contacts OC1 in case of excessive load on the hoist. The shunt coil OCS then functions to hold contacts OC1 closed after the current in series coil OC has diminished to below a predetermined value. The purpose of the relay embodying the coil OC is to cause the speed of the hoist to be decreased below full running speed in the event of an excessive load. This is done through closure of the relay contacts 3FA1 (Fig. 2, part A) in response to the coil 3FA (Fig. 2, part C) which is controlled by the contacts OC1.

12OL, 11OL, 22OL and 21OL are series coils of overload relays (Fig. 2, part A). The contacts of these relays are designated, respectively, 12OL1, 11OL1, 22OL1 and 21OL1 (Fig. 2, part B). All these contacts are biased to closed position and are connected in circuit with the coil UV (Fig. 2, part B), which forms part of an undervoltage relay, to be referred to presently.

The characters 11Br and 21Br (Fig. 2, part A) are the series coils of series brake relays having, respectively, the contacts 11Br1 and 21Br1 (Fig. 2, part C), which contacts are biased to open position and are closed when current flows in coils 11Br and 21Br. Closure of said contacts 11Br1 and 21Br1 results in the energizing of coils 1Br and 2Br of the brake relays, which have the function of releasing the brakes 5 and 6. The series brake relays embodying the coils 11Br and 21Br have the function of preventing release of the brakes 5 and 6 until after sufficient current flows in the armature circuits of the motors 1 and 2 to develop torque of sufficient magnitude to insure safety when the brakes are released.

Contacts 11L1, 12L1, 11R1 and 12R1, and similarly 21L1, 22L1, 21R1 and 22R1 (Fig. 2, part A) are the main contacts of directional contactors responsive, respectively, to the coils 11L, 12L, 11R, 12R, 21L, 22L, 21R and 22R (Fig. 2, part B). These contactors function to determine the direction of flow of current in armatures 1 and 2, thereby determining the direction of movement of the hoist. The directional contactors having coils 11L, 12L, 21L and 22L are provided, respectively, with auxiliary contacts 11L2, 21L2, 11R2 and 21R2 (Fig. 2, part B), the functioning of which will be explained presently.

Contacts 11A1, 12A1 and similarly 21A1 and 22A1 (Fig. 2, part A) are the main contacts of accelerating contactors responsive, respectively, to the coils 11A, 12A, 21A and 22A (Fig. 2, part D). These contactors function, respectively, to cut into and out of circuit resistors 1R1—1R2, 1R2—1R3, 2R1—2R2 and 2R2—2R3, which may be designated as parallel accelerating resistors (Fig. 2, part A). These contactors have additional auxiliary contacts 11A3 (Fig. 2, part C), 11A4 (Fig. 2, part D), 11A5 (Fig. 2, part D), 12A3 (Fig. 2, part C), 12A4 (Fig. 2, part C), 21A2 (Fig. 2, part C), 21A3 (Fig. 2, part C), 21A4 (Fig. 2, part D), 22A3 (Fig. 2, part C) and 22A5 (Fig. 2, part D). Of these contacts, 11A3, 11A5, 12A3, 12A4, 21A2, 21A3, 22A3 and 22A5 are biased to closed position and are open when their corresponding coils are energized, and contacts 11A4 and 21A4 are biased to open position and are closed when their corresponding coils are energized.

Contactors 11P1 and 22P1 (Fig. 2, part A), both biased to open position, are responsive to coils 11P and 22P respectively (Fig. 2, part C). These contactors function to connect the armatures 1 and 2 in parallel across the mains. Said coil 11P also controls additional contacts 11P2 (Fig. 2, part B), biased to closed position, 11P3 (Fig. 2, part C), biased to closed position, 11P4 (Fig. 2, part C), biased to open position, and 11P5 (Fig. 2, part C), biased to open position. Contactor coil 22P also controls contacts 22P2 (Fig. 2, part B), biased to closed position, 22P3 (Fig. 2, part C), biased to closed position, 22P4 (Fig. 2, part C), biased to open position, and 22P5 (Fig. 2, part C), biased to open position.

Contactor S1 (Fig. 2, part A) is responsive to the coil S as shown at the top of Figure 2, part C.

This contactor S1 functions to connect armatures 1 and 2 in series. This contactor has additional contacts S2 and S3, both biased to closed position, and S4 and S5, both biased to open position. Contacts S2, S3 and S5 are shown in Figure 2, part C, and contact S4 is shown in Figure 2, part D. Contactors 1A1 and 2A1 (Fig. 2, part A), both biased to open position, respond to the coils 1A and 2A (Fig. 2, part C). These contactors function to control series accelerating resistors R1—R2 and R2—R3 (Fig. 2, part A). Said contactors 1A1 and 1A2 have additional contacts 2A2, biased to closed position, 2A3, biased to closed position, and 2A4, biased to open position (all as shown in Fig. 2, part C). The function of these auxiliary contacts will appear presently.

Contactors 1AS1 and 2AS1 (Fig. 2, part A), both biased to open position, are responsive to coils 1AS and 2AS (Fig. 2, part D). These contactors function, respectively, to connect resistors R10—R11 and R12—R13—R14 into armature shunting relationship with armatures 1 and 2 for two-motor operation. When operating with a single motor both of these contactors 1AS1 and 2AS1 function to connect the aforementioned resistors into armature shunting relationship with whichever armature is selected for operation. These contactors have additional contacts 1AS3 (Fig. 2, part B), biased to open position, and 1AS2 (Fig. 2, part D), biased to open position.

Coil FL (Fig. 2, part A) is connected in series with the shunt fields of the motors 1 and 2. Said coil controls the contact FL1 (Fig. 2, part B), biased to open position. This contact FL1, together with a number of other contacts, to be referred to presently, is in circuit with the coil UV of an under-voltage relay (Fig. 2, part B), to be referred to presently.

The relay contacts 1FA1, 2FA1 and 3FA1, all biased to open position (Fig. 2, part A), are responsive, respectively, to coils 1FA, 2FA and 3FA (Fig. 2, part C). These relay contacts function to control resistors C—D, D—E and F—G, all connected in circuit to the shunt field windings of the motors 1 and 2 and control the strength of the motor fields. Coil 1FA also controls the auxiliary contact 1FA2 (Fig. 2, part D), biased to open position. Coil 2FA also controls auxiliary contacts 2FA2 (Fig. 2, part E), biased to open position, and 2FA3 (Fig. 2, part B), biased to open position. Coil 3FA also controls the auxiliary contacts 3FA2 (Fig. 2, part B), biased to open position, and 3FA4 (Fig. 2, part C), biased to open position.

Resistors H—I and J—L are resistors which by manipulation of the knife switches FT1 and FT2 (Fig. 2, part A), may be substituted for the shunt fields of motor 1 and motor 2, respectively.

Relay contacts 1Br1 and 2Br1 (Fig. 2, part A), both biased to open position, are responsive, respectively, to coils 1Br and 2Br (Fig. 2, part C). These are shunt relays which control the introduction of current into the operating solenoids BC5 and BC6 of brake 5 and brake 6. Brake relay 1Br has additional contacts 1Br2 and 1Br3 (Fig. 2, part C), both biased to open position, and 1Br4 (Fig. 2, part E), biased to closed position. Brake relay 2Br has the auxiliary contact 2Br2 (Fig. 2, part D), biased to open position. Brake 5 is provided with the operating solenoid BC5. Brake 6 is provided with the operating solenoid BC6.

Resistor M—N may be substituted for brake solenoid BC5 of brake 5, or for brake solenoid BC1 of brake 6 by manipulating the switches associated with said solenoids. This is done when it is desired to remove one or the other of the brakes from service temporarily, continuing with the remaining brake in service.

The under-voltage relay, the coil of which is designated by the character UV and the contacts of which are designated by the character UV1, is shown in Figure 2, part B. This relay functions to protect the hoist in case of failure of voltage. It also responds to various safety devices such as overload relays 11OL, 12OL, 21OL and 22OL, which have their corresponding contacts 11OL1, 12OL1, 21OL1 and 22OL1 located in series with said under-voltage relay coil UV. Said coil UV also responds to loss of the shunt field, resulting in the opening of the contacts FL1, responsive in turn to the field loss coil FL (Fig. 2, part A). It also responds to the opening of the slack cable switch SC1, which through instrumentalities well known to those skilled in the art is caused to open in case either cable at the hoist becomes slack. The under-voltage coil UV also responds to the switch OS1, biased to closed position, which may be responsive to an overspeed device, which, if preferred, may be controlled by a fly ball governor. Devices for this purpose are well known to those skilled in the art. It may be explained that in case the hoist attains excessive speeds, the switch OS1 will be opened mechanically. The under-voltage coil UV also responds to a combination of contacts arranged to protect the hoist in case it fails to slow down when it approaches the limit of its travel. These contacts are embodied in the members RSU1, biased to closed position and responsive to a coil RSU, to be described presently; LS4 responsive to a limit switch, to be described presently; RS4 responsive to a limit switch, to be described presently; LSU1, biased to closed position, responsive to the coil LSU, to be described presently; 11P2 and 22P2, both biased to closed positions and responsive respectively to coils 11P and 22P (Fig. 2, part C), to be described presently; contacts 3FA2, biased to open position and responsive to coil 3FA (Fig. 2, part C), to be described presently; contacts 2Br2, biased to closed position and responsive to coil 2Br (Fig. 2, part C), to be described presently; stage CTS4, to be described presently; contacts 2FA2 biased to open position and responsive to coil 2FA (Fig. 2, part C), to be described presently; and the contacts 1AS2, biased to open position and responsive to coil 1AS (Fig. 2, part D).

The words "Stop Reset-Run" indicate a push button of the walking beam type (Fig. 2, part B). This push button functions to stop the hoist in case of emergency and to reset the under-voltage relay after a voltage failure or after an emergency stop. The operator, in the event of an emergency, may stop the hoist by depressing the "Stop Reset" side of the walking beam, thereby opening the switch UVL and opening the circuit of the coils 11L, 12L, 21L, 22L, 11R, 12R, 21R and 22R. Said "Stop Reset-Run" button will remain in the position to which it is moved by the operator. Depressing of the "Stop Reset" button results in the closing of switch UVU (Fig. 2, part B). Depressing of the "Run" button of the walking beam will open the switch UVU and will close the switch UVL.

The circuit diagram in Figure 2 includes a number of stages or switches bearing the letters CTS, followed by a numeral. These switches are all part of a control transfer switch CTS. This control transfer switch CTS is preferably located in the hoist house and has the function of prearranging a large number of circuits for accomplishing a prearranged sequence of events in the operation of the motors 1 and 2, or either of them, and their associated parts. According to the illustrated embodiment of the present invention, the control transfer switch CTS has five alternative operative positions, which permit the selection of five ways for operating the hoist mechanism, as follows:

(a) The hoist can be driven by motor No. 1 only, controlled from the hoist house.

(b) The hoist mechanism may be driven by motor No. 1 only, controlled from the stock house.

(c) The hoist mechanism may be driven by both motors, controlled from the stock house.

(d) The hoist mechanism may be driven by motor No. 2 only, controlled from the stock house.

(e) The hoist mechanism may be driven by motor No. 2 only, controlled from the hoist house.

The control transfer switch must effect changes in a multiplicity of control circuits. This is done by combining many small switches in a mechanism adapted to change all of the circuits simultaneously. By positioning this control transfer switch in any one of five operating positions, it is possible to effect five combinations of a multiplicity of circuits. The postioning of the control transfer switch in any one of the five alternative operating positions mentioned accomplishes the opening and closing of a multiplicity of switches in a large number of circuits to cause the rearrangement of these circuits to accomplish the desired sequence of events in the operation of the motor or motors.

In other words, considering operation from the stock house, if the control transfer switch is in a position corresponding to (b), (c) or (d) above, combinations of circuits are set up whereby the operator in the stock house, by mere pressing of the LSUB or RSUB button (Fig. 2, part B), can institute a cycle of operations which will follow through automatically. On the other hand, if the control transfer switch is in a position corresponding to (a) or (e), according to which control is transferred to the hoist house, the operator in the hoist house may start or stop the corresponding motor by operating a master switch, which master switch is indicated diagrammatically in Figure 2, part D, to be described presently. The controls are such that when the control transfer switch is in a position corresponding to (a) or (e), the operator in the stock house has no control over the operation of the system except to stop the hoist in emergency, which he can do by depressing the "Stop Reset" button (Fig. 2, part B).

Control transfer switches suitable for the purpose above described are well known to those skilled in the art and need not be described in detail. It will be sufficient to state that the switches or stages which are embodied in the control transfer switch CTS involve contacts indicated by the letters a—b and b—c. By reference to the chart appearing in Figure 3 it will be noted that switches or stages are involved having the numerals 1, 3, 4, 5, 6, 7, 8, 9, 10, 11, 12, 13, 14, 15, 16, 17, 19, 20, 21, 22, 23, 24, 25, 26, 27, 28 and 29. X signifies that the corresponding switch or stage is closed and a dash indicates that the corresponding switch or stage is open at the contacts a—b or b—c. For example, referring to the stage CTS1, by reference to the chart Figure 3, it will be noted that if the control switch CTS is moved to one of its five alternative positions such that the control of motor No. 1 is to be had from the hoist house, the contacts a—b are closed and contacts b—c are open. If control of motor No. 1 is to be had from the stock house, the control transfer switch would be moved to the second of its five alternative positions, in which position the contacts a—b would be open and the contacts b—c would be closed. In the event that two-motor control from the stock house is desired, control transfer switch would be thrown to the third of its five alternative positions, and contacts a—b would be open and the contacts b—c would be closed. If control of motor No. 2 is desired from the stock house, the control transfer switch would be thrown to the fourth of its five alternative positions, in which case contacts a—b of stage CTS1 would be open and contacts b—c would be closed. Finally, if control of motor No. 2 is to be had from the hoist house, the control transfer switch CTS would be moved to the fifth of its five alternative positions, in which case the contacts a—b of CTS1 would be closed and the contacts b—c would be open.

Contacts LSU1 and RSU1 (Fig. 2, part B), both biased to closed position, are responsive to the coils LSU and RSU (Fig. 2, part B). These are component parts of directional relays which respond to push buttons LSUB and RSUB, which determine the direction of movement of the hoist. These relays have a number of other contacts, to wit, LSU2 and RSU2 (Fig. 2, part B), and LSU3, LSU4, RSU3 and RSU4 (Fig. 2, part D). Said push buttons LSUB and RSUB are located at the two ends of a walking beam, and when the push button LSUB is depressed, it closes switch LSUB1 and opens switch RSUB1. Conversely, when the push button RSUB is depressed, it opens switch LSUB1 and closes switch RSUB1.

The characters LS5 and RS5 indicate contacts responsive to a limit switch, to be described presently.

The character 1T indicates the coil of a time relay (Fig. 2, part C). Said coil controls the contacts 1T1 and 1T2, both biased to closed positions, and functions to introduce a time delay in the energization of the coils 1A and 2A to control the acceleration of the motors 1 and 2 when their armatures are connected in series. Said coils 1A and 2A control the contacts 1A1 and 2A1, respectively (Fig. 2, part A), both biased to open position.

2T designates a coil of a timing relay (Fig. 2, part C). This coil controls contacts 2T1 and 2T2 (Fig. 2, part D), both biased to closed position. Said contacts function to control the energization of coils 11A, 21A, 12A and 22A, which in turn control the contacts 11A1, 21A1, 12A1 and 22A1 (Fig. 2, part A), which control the series accelerating resistors in the circuits of the two armatures 1 and 2 connected in parallel.

3T designates the coil of a timing relay having the contacts 3T1 and 3T2, biased to open position (Fig. 2, part C). This relay functions to control the time of energization of relay coils 2FA and 3FA, which in turn control the relay contacts 2FA1 and 3FA1 (Fig. 2, part A), which control the strength of the shunt fields of the motors 1 and 2.

4T (top of part D of Fig. 2) designates the coil of a timing relay having the contacts 4T1 (Fig. 2, part C), biased to closed position. Contacts 4T1, by their closure, cause energization of the series contactor coil S, thereby initiating a transfer from the parallel connection to the series connection at the time of slow-down. The timing relay having the coil 4T introduces a time element to delay this transfer by a desired time interval after the opening of contacts 1SD5 (Fig. 2, part D), later discussed.

1SD designates a coil of a "first slow-down" relay. This coil is shown in Figure 2, part D. The relay has a number of contacts, to wit, 1SD6, biased to open position, 1SD1, biased to closed position, 1SD2, biased to closed position, 1SD3, biased to closed position, all appearing in Figure 2, part C, and 1SD5, biased to open position (Fig. 2, part D), and 1SD6, biased to open position (Fig. 2, part D), and 1SD7, biased to closed position, appearing in Figure 2, part D. Said coil (Fig. 2, part D) is energized when the running positive bus RPB is energized at the time that the hoist was started by depressing the button RSUB. At this time the contacts RS2 in circuit with the coil 1SD are bridged by the segment RS2 of a limit switch to be described presently. However, coil 1SD is deenergized when the hoist reaches its "first slow-down" point, as determined by said limit switch, due to the fact that said contacts RS2 will be unbridged by the limit switch segment RS2. Deenergization of the coil 1SD results in the strengthening of the shunt fields of the motors, and subsequently it causes transfer from parallel to series connection of the motors. The mode of operation for accomplishing these changes will be described under the heading "Mode of operation."

2SD designates the coil of a "second slow-down" relay. This coil is shown in Figure 2, part D. This relay has contacts 2SD1, biased to open position, and 2SD2, biased to closed position (Fig. 2, part C), and 2SD3, biased to open position (Fig. 2, part D). This relay functions to energize the coil 1FA when the hoist approaches the end of travel. Its circuit is from main 1L2 through contacts S4, contacts 2SD1, contacts b—c of CTS8, through coil 1FA to negative main 1L1. Energization of the coil 1FA causes the closure of the contacts 1FA1 (Fig. 2, part A), short-circuiting the resistor CD, forcing the shunt fields and further slowing down the speed of the motors. As applied to single-motor operation, this relay functions through the contacts 2SD3 to energize the coil 2AS (Fig. 2, part D), causing the closure of the contacts 2AS1 (Fig. 2, part A), thereby shunting the armature of said motor to reduce the speed thereof.

A walking beam type push button designated as "slow-normal" is shown in Figure 2, part D, in series with the coil 1SD. If the "Slow" button is depressed, coil 1SD cannot be energized. The "first slow-down" relay therefore does not close (or it opens if already closed), thereby causing the motor to act as it would at the "first slow-down" point, namely, to reduce its speed or to continue at low speed if started.

The limit switch above referred to will now be described. Portions of said limit switch appear at the right-hand regions of Figure 2, part B; Figure 2, part C; and Figure 2, part D. It has a reciprocable member connected to the winding drum 12 and is adapted to move toward the right when the right skip is moving upwardly, which means that the left skip is moving downwardly. Said limit switch moves to the left when the right skip is moving downwardly, which means that the left skip is moving upwardly. Said limit switch is provided with segments LS4, RS4, LS5, RS5, LS6, RS6, LS2, RS2, LS3, RS3, LS7, RS7, LS8 and RS8. Each of these segments is adapted to bridge or unbridge a similarly designated pair of contacts located opposite thereto in the various portions of Figure 2. For example, contacts LS4 (Fig. 2, part B) are closed when these contacts are bridged by the corresponding segments LS4.

When the hoist starts to hoist the left skip, contacts LS4 are bridged by the extreme left portion of the segment LS4. As the left skip ascends, segment LS4 may be considered as moving toward the left over the contacts LS4. When the left-hand skip has ascended to a point approaching its limit of travel, contacts LS4 are no longer bridged by the segment LS4. Similarly, contacts RS4 are bridged by the right-hand portion of the segment RS4 when the right skip starts to ascend. Segment RS4 departs from a bridging relationship with contacts RS4 when the right skip approaches its limit of travel.

The lengths of the various segments are so chosen as to govern the particular points in the skip travel at which the various actions are to occur. For instance, segment LS5 cooperates with contacts LS5 to cause the hoist to be stopped by deenergizing the coil LSU when the left skip reaches the extreme limit of upward travel.

Under usual operation, the control responds to push buttons LSUB and RSUB, previously described (Fig. 2, part B). At times, however, it is desired to control the movements of the skip hoist at the hoist house. This is done, for example, when cables are to be adjusted, etc. For this purpose the master switch MS (Fig. 2, part E) is provided at the hoist house. This master switch MS is conventionally shown in diagrammatic form. It is an article of commerce and need not be described in detail. It may be stated briefly that the particular master switch MS for cooperation with the remaining elements of the system will have an "off" position and, as illustrated, has six positions to the right for determining six different speeds of upward movement of the right skip and six positions to the left for determining six different speeds of upward movement of the left skip. Master switches are readily available having any number of positions within a wide range. The master switch MS has nine stages, as indicated. The topmost of these nine stages controls the switch MS1. When the master switch is in its "off" position, said switch MS1 is closed. When said master switch is at any of its six illustrated positions to the right or any of its six illustrated positions to the left, the switch MS2 is closed, as indicated by the X's marking the intersection of the line representing stage 2 with the particular position or point of the master switch.

With respect to stage 3, the switch MS3 is closed when the master switch is in its "off" position and is closed when said master switch is in the first, second or third position to the right or to the left, but is open when the master switch is in the fourth, fifth or sixth position to the right or to the left.

With respect to stage 4, the switch MS4 is open when the master switch is in the "off" position, is closed when the master switch is in any one of the six illustrated positions to the left, and is open when the master switch is in any one of the six illustrated positions to the right.

With respect to stage 5, the switch MS5 is open when the master switch is in the "off" position and is also open when the master switch is in any one of its six illustrated positions to the left, but is closed when the master switch is in any one of the six illustrated positions to the right.

With respect to stage 6, the switch MS6 is open when the master switch MS is in the "off" position, is closed when the master switch is in the first, second, third or fourth position either to the right or left, and open when the master switch is in the fifth or sixth position to the right or left.

With respect to stage 7, the switch MS7 is open when the master switch is in "off" position, is closed when the master switch is in the first, second, third, fourth, or fifth position to the right or left, and is open when the master switch is in the sixth position to the right or left.

With respect to stage 8, the switch MS8 is open when the master switch MS is in "off" position, is closed when the master switch is in the first or second position to the right or left, and is open when said master switch is in the third, fourth, fifth, or sixth position to the right or left.

With respect to stage 9, the switch MS9 is open when the master switch is in "off" position, is closed when the master switch is in the first position either to the left or right, and is open when the master switch is in the second, third, fourth, fifth, or sixth position to the left or right.

By reason of the master switch MS, the operator may control the speed of ascent of either skip by choosing any one of the six illustrated positions to the right or left, depending upon which skip he desires to have ascend. The first position in either direction gives a minimum speed. The second position gives the next higher speed, etc., until the sixth point is reached, at which point the maximum speed of operation results. This speed of operation is controlled by the relays and contactors responding to the position of the control transfer switch CTS. As will be explained presently, other positions, such as a seventh position for upward movement of each skip, may be utilized for further refinements of control.

Various conductors have been shown, indicated by the characters C0, C1, C2, C3, C4, C5, C6, C7, C8, C9, etc. These conductors have been broken away to avoid the multiplicity of lines, but their connections will be perfectly clear from the diagram.

Mode of operation

The detailed description of the mode of operation of the above described instrumentalities will be prefaced by a brief outline of the mode of operation, omitting intermediate steps. This brief outline will be followed by a more complete description.

Referring first to normal two-motor operation, and assuming that the right-hand skip is in the pit, the operator will depress the button RSUB, resulting in the closure of the contactor S1 connecting the armatures 1 and 2 in series. The resistors R1—R2 and R2—R3 are in this series circuit. The relays connected across the resistors C—D, F—G and D—E are open while the motors are at rest and while the starting operation is initiated.

Thus it will be observed that with the motors idle, the resistors are operative and the fields are weak and remain weak until after the contactor coil S is energized. The motors are thereby started with weak fields, so that a soft torque is exerted when the brakes release. The fields are strengthened and forced gradually, due to their time constants, and a strong torque for starting is promptly but gradually developed. The coils 1A and 2A are energized in timed sequence, and the resistors R1—R2 and R2—R3 are short-circuited, and the hoist is accelerated to a speed of about 85 F. P. M., corresponding to series connection of the motors with their shunt fields forced. The relay shunting the resistor C—D is then opened, thereby introducing the resistor C—D into circuit, and the speed increases slightly to about 110 F. P. M. According to preferred practice, the skip hoist is operated at about this speed while the capsized upper skip is righted and returns to the straight portion of the incline. At this point the limit switch LS1 is closed, and the result is to place the armatures in parallel and to deenergize the coil 2T. Resistors 1R1—1R2 and 2R2—2R1, and also the resistors 1R3—1R2 and 2R3—2R2, are short-circuited, so that each motor has full voltage across its armature and the motor fields have intermediate strength. Under these circumstances the running speed is about 220 F. P. M.

The accelerating coil 3T is then deenergized, opening the contacts 3T1 and 3T2 in timed sequence, causing contacts 2FA1 and 3FA1 to open, introducing resistors D—E and F—G into the shunt field circuits of the motors 1 and 2, which are thereby accelerated to full running speed of about 350 F. P. M.

At the first slow-down point the limit switch contacts RS2 are unbridged, resulting in the deenergization of the relay coil 1SD, introducing resistors 1R3—1R2, 1R2—1R1 and 2R3—2R2, 2R2—2R1, into their respective motor circuits and also short-circuiting the resistors D—E and F—G, causing the motors to slow down.

Deenergization of the coil 1SD also causes the deenergization of the relay coil 4T, which after a time delay connects the motor armatures in series with resistors R1—R2, R2—R3. After a further time delay these resistors are short-circuited and the motors are connected in series at intermediate field strength and have a speed of approximately 110 f. p. m.

At the slow-down check point the contacts RS4 of the limit switch are unbridged. If transition from parallel operation has not taken place, and if the shunt fields of the motors have not been strengthened by closure of the contacts responsive to the coils 2FA and 3FA, the coil UV will be deenergized and the hoist will stop. This is a safety feature.

At the second slow-down point contacts RS3 of the limit switch are bridged, resulting in the energizing of coil 2SD, short-circuiting the resistor C—D, thereby forcing the motor fields, reducing the speed to about 85 f. p. m. The energizing of coil 2SD also opens the slow-down contacts 2SD2 to introduce resistor R2—R3 into the series armature circuit.

At about the extreme limit of travel the third slow-down point is reached, and the limit switch contacts RS8 are bridged, which introduces resistors R10—R11 and R12—R14 into armature shunting relationship with the motors 1 and 2, reducing the speed to about 70 f. p. m.

At the limit of travel the limit switch contacts RS5 are unbridged, the motor armatures are given an electrical braking influence, and the brakes are set.

When either of the motors is operated singly from the stock house, the knife switches 1KS, 2KS, 3KS and 4KS and field transfer switch FT1 or FT2 will be manipulated, as described hereinafter, to control the resistors R10—R11 and R12—R14, so that said resistors will be connected appropriately for single-motor operation.

When either of the motors is to be operated singly from the hoist house, the master switch MS is employed. Said master switch will be thrown to the right or left, according to which skip is to be hoisted. The speed of hoisting will be determined by the six points of the switch to the right or to the left.

Proceeding now with a more detailed description of the mode of operation, reference will first be had to normal two-motor operation.

Assuming that the right-hand skip is in the pit, the hoist is started by depressing the button RSUB (Fig. 2, part B). This completes a circuit across the mains, through the contacts a—b of CTS6 (closed—see chart Fig. 3), relay coil RSU and through limit switch contacts RS5, which at this time are bridged by segment RS5, since the left skip is at the top of the incline and the limit switch segments (in their entirety) had been moved to the extreme left. Inasmuch as the coil RSU controls the contacts RSU2 (biased to open position when coil RSU is deenergized but closed when RSU is energized), the result is the energization of the coils 11R, 12R, 21R and 22R, which are the operating coils of the contactors 11R1, 12R1, 21R1 and 22R1 (Fig. 2, part A), determining the directions of rotation of the armatures 1 and 2.

The coils 11R and 21R also control the contacts 11R2 and 21R2, both biased to open position when their corresponding coils 11R and 21R are deenergized, but closed when said coils are energized. Energizing of said coils 11R and 21R closes the contacts 11R2 and 21R2 (Fig. 2, part B), connecting the running positive bus RPB to the positive main 1L2. This completes a circuit through the b—c contacts of CTS7 (Fig. 2, part C) through the contacts 11P3 and 22P3, both biased to closed position, and through the operating coil S of a contactor which includes main contacts S1 (Fig. 2, part A), biased to open position, and auxiliary contacts S2, biased to closed position, S3, biased to closed position, S4, biased to open position, and S5, biased to open position. Energization of the coil S results in the closure of the contacts S1 (Fig. 1, part A), connecting in series the armatures of motors 1 and 2. The resistors R1—R2 and R2—R3 are in series circuit with said armatures at this time, since the switches 1A1 and 2A1 are open.

Energization of the coil S also closes its contacts S4, which action connects the series positive bus SPB to the left-hand main 1L2, thereby energizing said series positive bus. Energization of the coil S also closes the contacts S5, connecting the negative bus NB to the negative main 1L1, thereby energizing said negative bus.

Coils 11Br and 21Br are connected in the circuit, between the mains 1L2 and 1L1, through which current flows through the armatures of the motors 1 and 2 in series. The contacts 11Br1 and 21Br1 are thereby closed.

When the series positive bus SPB is energized, a circuit is completed to the contacts a—b of CTS14 (Fig. 2, part C, closed at this time—see Fig. 3) and coil 2T. Energization of the coil 2T causes closure of the contacts 2T3, completing a circuit from the running positive bus RPB through the contacts 2T3, 11BR1, 21BR1, coils 1Br and 2Br and contacts S5 to the negative main 1L1. Coil 1Br controls the contacts 1Br3, and when said contacts 1Br3 close, this action closes a maintaining circuit for the coils 1Br and 2Br.

The coil 2Br controls the switch 2Br1. Contacts 1Br1 and 2Br1 are in the circuit across the mains including the brake coils BC5 and BC6 for the motors 1 and 2, respectively, provided knife switches BT1 and BT2 are all in their upper positions connecting the brake coils BC5 and BC6 in series. Energization of the brake coils BC5 and BC6 causes the brakes to release. Thus, if sufficient current passes through the armatures of the motors 1 and 2 to devleop adaquate torque (as measured by the series relay coils 11Br and 21Br), the brakes are released and hoisting begins.

The series positive bus SPB has been energized by the closure of the contact S4. A circuit is completed through the contacts 2A2 (Fig. 2, part C—biased to closed position), through contacts 1SD8, closed at this time, through the b—c contacts of CTS8, closed (see diagram Fig. 3), and through the relay coil 1FA. Energization of the coil 1FA closes the contacts 1FA1, short-circuiting the resistor C—D in the shunt field of motor 1.

The accelerating relay coil 3T (Fig. 2, part D) is connected across the mains 1L2 and 1L1 through the contacts 12A4, biased to close. Energization of the coil 3T closes its contacts 3T1 and 3T2 (Fig. 2, part C). Consequently the field relay coil 3FA is connected between the running positive bus RPB through contacts 3T2 and contacts S5 (now closed), and the negative main 1L1.

Energization of the coil 3FA closes the contacts 3FA1, shunting out the resistor FG in the shunt field of motor 2 (Fig. 2, part A).

Energization of the coil 3FA also closes the contacts 3FA3 (Fig. 2, part C). Circuit is now completed from the running positive bus RPB to the contacts 3T1, 1Br2 and 3FA3 and the coil 2FA to the negative bus NB, now connected to the negative main 1L1 through the contacts S5.

Energization of the coil 2FA causes the closure of the contacts 2FA1, shunting out the resistor DE (Fig. 2, part A) from the shunt field circuit of the motors.

Thus it may be observed that while the motors stand idle, the resistors C—D, D—E and F—G are in the shunt field circuit and the motor fields are weak. The fields remain in this weakened condition until after the series contactor coil S is energized to cause the completion of the armature circuit, and a major portion (the resistor D—E) is in circuit until after the brake relay coil 1Br is energized to close contacts 1Br2 to energize the coil 2FA to close the contacts 2FA1 to short-circuit said resistor D—E. Thus the motors are started with weak fields, so that a soft torque is exerted when the brakes release, and any slack (catenary effect) in the cables is taken up smoothly. The fields are strengthened and forced gradually due to the inherent magnetic time constant of the fields, and a strong torque for starting the hoisting is promptly but gradually developed.

The energization of the series contactor coil S causes the opening of its auxiliary contacts S3 (Fig. 2, part C). This causes the coil of the accelerating relay 1T to be deenergized. This relay opens with an inherent time delay.

Deenergization of the relay coil 1T causes the contacts 1T1 and 1T2 to close in time sequence. Thus the coils 1A and 2A of the series circuit accelerating contactors 1A1 and 2A1 are energized and these contactors close, cutting out the resistors R1—R2 and R2—R3 (Fig. 2, Part A). The hoist is thus accelerated to a speed which may be about 85 f. p. m., corresponding to a series connection of the motors running with their shunt fields forced. Closure of the series accelerating contactor 2A1 causes its auxiliary contacts 2A2 to be opened, thereby opening the circuit of the field relay coil 1FA (Fig. 2, part C). Deenergization of the coil 1FA causes the opening of its contacts 1FA1, thus introducing the resistor C—D into the shunt field circuit of the motors (Fig. 2, part A). The speed of the motors therefore increases slightly, and the hoist may attain a speed of about 110 f. p. m. According to preferred practice, the hoist is operated at about this speed while the upper, capsized skip is righted and returned to the straight portion of the skip incline.

When the skips have traveled a short distance, as above described, contact is made at the limit switch LS1 (Fig. 2, part C), since the left skip is backing off from its top position.

A circuit is thereby completed from the main 1L2 through the contacts b—c of CTS13 (see the chart Fig. 3), through the auxiliary contacts 2A4 associated with the accelerating contactor coil 2A, through the contacts 11A3 and 12A3, through the coil of paralleling contactor 11P, through the contacts 1SD4 (which are closed as later described) through the limit switch contacts RS1 and LS1, to the negative bus NB, thence through the contacts S5 to the negative main 1L1 (Fig. 2, part C).

A similar circuit extends from the contacts 2A4 through the contacts b—c of CTS11 and CTS12, through the auxiliary contacts 21A3 and 22A3, through the coil of paralleling contactor 22P, and thence through contacts 1SD4, limit switches RS1 and LS1 and contacts S5, to the negative main 1L1. The paralleling contacts 11P1 and 22P1 therefore close. As a result, a circuit is completed from a positive main 1L2 through the knife switch 2KS, through the contacts 22P1, through the resistors 2R3—2R2, 2R2—2R1 (Fig. 2, part A), and through the stabilizing field of motor 2 in parallel with the armature of motor 1. Similarly, a circuit is completed through the stabilizing field coil of motor 1, through the resistors 1R3—1R2, 1R2—1R1, through the contacts 11P1 and the knife switch 1KS, to the negative main, thereby completing a circuit in parallel with the armature of motor 2. This is substantially equivalent to placing resistors 2R3—2R2, 2R2—2R1, 1R3—1R2 and 1R2—1R1 across the line. Consequently, there is a small increase in the current taken from the system while the performance of the motors is not substantially affected.

It may be noted that the auxiliary contacts 11P4 and 22P4 are now closed, thereby completing a circuit paralleling the contacts S5 between the negative bus NB and the negative main 1L1.

Energization of the paralleling contactor coils 11P and 22P causes the opening of the auxiliary contacts 11P3 and 22P3, thereby deenergizing the coils of the series contactor, since contacts 1SD1 are now open. The motors are now operating in parallel, with fields of intermediate strength, with their parallel accelerating resistors IR3—IR2, IR2—IR1, 2R3—2R2 and 2R2—2R1 in circuit.

It should be noted that transition from the series connections of the motors to the parallel connection thereof can be initiated only if the accelerating contactor coils 11A, 12A, 21A and 22A (Fig. 2, part D) are deenergized, thereby closing their auxiliary contacts 11A3, 12A3, 21A3 and 22A3, respectively (Fig. 2, part C). It should also be noted that the auxiliary contacts 11P5 and 22P5 complete maintaining circuits for contactor coils 11P and 22P independently of the circuits through the auxiliary contacts 11A3, 12A3, 21A3 and 22A3.

The deenergization of the series contactor coil S causes the accelerating relay coil 2T to be deenergized because of the opening of auxiliary contacts S4 which connect the series positive bus SPB with the positive main IL2 (Fig. 2, part C). Deenergization of the coil 2T results in the closing of the contacts 2T1 and 2T2 (Fig. 2, part D) in timed sequence (due to timing inherent in the relay). Closure of these two contacts results in the closure of the parallel accelerating contactors having coils 11A and 21A and contacts 11A1 and 21A1, which short-circuit the resistors IR2—IR1 and 2R2—2R1, respectively. Accelerating contactors 12A1 and 22A1 also close, short-circuiting the resistors IR3—IR2 and 2R—2R3, respectively. The two motors now have full voltage impressed upon their armatures, and their fields have an intermediate strength. The running speed may approximate 220 f. p. m. Energization of the accelerating contactor coil 12A causes its contacts 12A4 to open, thereby deenergizing the accelerating relay coil 3T (Fig. 2, part D), resulting in the opening of the contacts 3T1 and 3T2 in timed sequence, deenergizing the coils 2FA and 3FA, thereby opening contacts 2FA1 and 3FA1 to introduce the resistors D—E and F—G into the shunt field circuits of the motors 1 and 2 (Fig. 2, part A). Thus the motors are accelerated to their full running speed. The hoist may attain a running speed such as 340 f. p. m.

When the ascending right skip approaches the top of the furnace the first slow-down takes place. This action is caused by the unbridging of the limit switch contacts RS2 by the limit switch segment RS2 (Fig. 2, part D). It should be noted that the relay coil 1SD (Fig. 2, part D) was energized when the running positive bus RPB was initially energized by closure of the auxiliary contacts 11R2 and 21R2 of the directional contactors (since the contacts RSU3 were closed). Those contacts responsive to the slow-down relay coil 1SD, which are biased to open position, were therefore closed when the right-hand skip had started from the bottom of the furnace and remained closed until the first slow-down point was reached.

The deenergization of the relay coil 1SD at first slow-down has several effects. As the result of opening of its contacts 1SD6 (Fig. 2, part D), paralleling accelerating contactor coils 11A, 21A, 12A and 22A are caused to open their respective contacts 11A1, 21A1, 12A1 and 22A1, introducing the resistors IR3—IR2, IR2—IR1 and 2R3—2R2, 2R2—2R1, into their respective motor circuits. The closing of the contacts 1SD2 and 1SD3 (Fig. 2, part C) when coil 1SD is deenergized causes the energization of the coils 2FA and 3FA, closing contacts 2FA1 and 3FA1 respectively (Fig. 2, part A), short-circuiting their respective resistors D—E and F—G, increasing the field strength of the motors 1 and 2, causing the motors to slow down. The temporary increase in armature voltage thus caused is absorbed in the accelerating resistors mentioned in the preceding sentence.

The opening of the contacts 1SD5 when coil 1SD is deenergized causes deenergization of the accelerating relay coil 4T (Fig. 2, part D). Contacts 4T1 close after a time delay sufficient to permit the partial slowing down mentioned in the preceding paragraph. The closure of the contacts 4T1 (Fig. 2, part C) completes a circuit from the running positive bus RPB through the contacts b—c of CTS7, contacts 2A3, 4T1, 1SD1 and contactor coil S to the negative main IL1. Energization of the contactor coil S results in the closure of contacts S1 (Fig. 2, part A), connecting the motor armatures in series to the resistors R1—R2 and R2—R3.

The energization of the contactor coil S (Fig. 2, part C) causes its auxiliary contacts S2 to open. Since the paralleling circuit is now open at 1SD4, the paralleling contactor coils 11P and 22P are deenergized and the contacts 11P1 and 22P1 open. Thus the motors are again connected in series by transition without power interruption.

While the hoist was running at full speed, with the motors in parallel, contacts S3 were closed and relay coil 1T was energized, holding open its contacts 1T1 and 1T2. When, due to the energization of the coil S, the contacts S3 open, the contacts 1T1 and 1T2 close in timed sequence. This leads to the closure of the accelerating contactor main contacts 1A1 and 2A1, thereby short-circuiting the resistors R1—R2 and R2—R3. The motors are now operating with their armatures in series across full voltage and with their fields at intermediate strength. The running speed may approximate 110 f. p. m.

After the hoist has traveled a short distance, the "slow-down check" point is reached in the hoist limit switch. At this point the contacts RS4 are unbridged by the segments RS4 of the limit switch. Since the contacts RSU1 are also open, the circuit through contacts 11P2, 22P2 and 3FA2 is alone intact (Fig. 2, part B). This circuit is intact if both the paralleling contactor coils 11P and 22P are deenergized and if coil 3FA is energized (Fig. 2, part C). The circuit will not be intact unless the transition from parallel operation of the motors has taken place and unless the shunt fields of the motors have been strengthened by closure of the contacts 2FA1 and 3FA1 (Fig. 2, part A) responsive to the relay coils 2FA and 3FA (Fig. 2, part C) to short-circuit the resistors D—E and F—G, respectively. Therefore, if the actions necessary to slow down have not taken place, all of the circuits connecting to the negative main IL1 are open and the coil UV is deenergized, since contacts a—b and b—c of switch CTS4 (Fig. 2, part B) are open. This leads to the stoppage of the hoist. This is a safety feature.

Assuming that the transition to series operation has functioned normally, the hoist continues at moderate speed until the second slow-down is reached. Limit switch contacts RS3 are then bridged by the segment RS3, thereby energizing the second slow-down relay coil 2SD (Fig. 2, part D). Energization of this relay coil 2SD causes closure of its contacts 2SD1 (Fig. 2, part C), thereby energizing the field relay coil 1FA. Energization of the coil 1FA results in the closing of the contacts 1FA1 (Fig. 2, part A), short circuiting the resistor C—D, thereby forcing the motor fields, reducing the hoist speed to about 85 F. P. M. The energization of coil 2SD also results in the opening of the second slow-down relay contacts 2SD2 (Fig. 2, part C), deenergizing the series accelerating relay coil 2A, thereby causing contacts 2A1 to open to introduce the resistor R2—R3 into the series armature circuit.

When the right skip has reached almost the extreme limit of travel the third slow-down point is reached. Limit switch contacts RS8 are bridged by the limit switch segment RS8, thereby completing a circuit through the closed contacts 1FA2 (Fig. 2, part D) through the contacts b—c of CTS16 and through the armature shunting contactor coil 1AS and the contacts 1SD7 to the negative main 1L1. A similar circuit is completed through the contacts b—c of CTS15, through the armature shunting contactor coil 2AS and contacts 1AS2, which were just previously closed. Closure of the contacts 1AS1 and 2AS1 introduces resistors R10—R11 and R12—R14 respectively (Fig. 2, part A), into armature shunting relationship with the motors 1 and 2. This causes a further reduction in hoist speed to about 70 F. P. M.

When the limit of travel is reached for the right skip, the limit switch contacts RS5 are unbridged by the limit switch segment RS5, thereby deenergizing the directional relay coil RSU. This leads to the open-circuiting of the directional contactor coils 11R, 12R, 21R and 22R (Fig. 2, part B), thereby opening contacts 11R1, 12R1, 21R1 and 22R1, disconnecting the motor armatures from the power system. Opening of the auxiliary contacts 11R2 and 21R2 causes the running positive bus RPB to be deenergized. This causes brake relay coils 1Br and 2Br to be deenergized, leading to the setting of the motor brakes. The motor brakes will ordinarily require a brief time for setting. Greater accuracy in stopping can be obtained if the motor armatures have a braking influence for a moment after the directional contacts 11R, 12R, 21R and 22R have opened. This is accomplished by delaying slightly the opening of the armature shunting circuits of the motors in the following manner.

Contactor coil 1AS (Fig. 2, part D) is deenergized when contacts 1FA2 are opened by deenergization of the coil 1FA, which in turn responds to the deenergization of the coil S and the consequent opening of the contacts S4. Contactor coil S is caused to open after the running positive bus RPB is deenergized. This roundabout sequence involves a sufficient time delay for the purpose desired. Similarly, the energization of contactor coil 2AS responds to the contacts 1AS2 (Fig. 2, part D), so that contacts 2AS1 follow contacts 1AS1 in opening. The fields are rather strongly magnetized during this instant due to their inherent time lags after field-forcing is discontinued. Therefore a considerable braking effect is realized.

It has been pointed out hereinabove that the hoist may be stopped before its trip has been completed if the control has failed to change over from the parallel connection to the series connection or if the motor field strengthening relay contacts 3FA2 (Fig. 2, part B) have not closed. In such event, the under-voltage relay UV will have opened. This relay may be reset by depressing the "stop and reset" button (Fig. 2, part B). The negative side of the circuit for the UV coil (Fig. 2, part B) passes through contacts RSU1 and LSU1. If the "run" button is now depressed, the hoist would tend to start, but as soon as the RSU1 or LSU1 contacts open, due to closure of one or the other directional relays LSU or RSU, the circuit of the UV coil will be interrupted and the contacts UV1 will be opened. To avoid the above circumstance, a circuit is provided through contacts 11P2 and 22P2 and 2Br3, whereby to maintain energization of the UV coil after contacts RSU1 or LSU1 have opened. This circuit is of temporary nature in view of the fact that contacts 2Br3 will open when the brake relay 2Br (Fig. 1, part C) functions. However, in the meantime sufficient time will have elapsed to permit closure of contacts 3FA2 (Fig. 2, part B). Thus, the continuity of the coil circuit UV is maintained and the hoist is permitted to complete its trip with parallel contactors 11P and 22P (Fig. 2, part C) open and with the motors operating in series.

*Single-motor operation from the stock house*

In the event that one motor should fail, operations can continue with single-motor drive in the same general manner as is followed when two motors are in use. It is only necessary that ore loads be somewhat restricted in weight. The running speed of the hoist may also be somewhat lower. Either motor may be employed.

Assuming that No. 1 motor is to be continued in operation, knife switch 1KS will be closed and knife switch 2KS open. Knife switch 3KS must be thrown up and knife switch 4KS thrown down. The field transfer switch FT2 (Fig. 2, part A) will be thrown down. The control transfer switch CTS will be turned to "motor 1 stock house."

The UV coil circuit is the same as for two-motor operation except that CTS4 is closed from a to b and b to c (see chart Fig. 3), so that the circuit which includes contacts 11P2 and 22P2 is shunted (Fig. 2, part B).

The hoist is started by depressing button RSUB for right skip up. The directional contactor coils 11R, 12R, 21R and 22R are energized to close their respective contacts. Closure of the auxiliary contacts 11R2 and 21R2 (Fig. 2, part B) energizes the running positive bus RPB. A circuit is thereby completed from the running positive bus RPB (Fig. 2, part E) through the a—b contacts of CTS22, through the conductor C2, contacts b—c of CTS11 (Fig. 2, part C), contacts 11A3, 12A3, coil 11P, contacts S2 and a—b of CTS9 to the negative main 1L1. Energization of the contactor coil 11P causes its main contacts 11P1 (Fig. 2, part A) to close, completing the circuit for motor No. 1.

Said main contacts 11P1 are maintained closed by a circuit from the positive main 1L2, through the contacts 1Br4 (Fig. 2, part E), a—b contacts of CTS23, through conductor C3 to c—b contacts of CTS14 (Fig. 2, part C) and coil 2T to the negative main 1L1. Energization of the coil 2T keeps contacts 2T4 (Fig. 2, part C) closed, and brake relay coils 1Br and 2Br (Fig. 2, part A) are energized as soon as the series brake relay contacts 11Br1 close (Fig. 2, part C). Contacts 21Br1 are short-circuited at CTS10 through contacts b—c. Thus the hoist is started. The shunt field relay coil 2FA is energized as soon as the brake relay contacts 1Br2 close, in the same manner as described above in connection with two-motor operation. Field relay coil 1FA follows the action of the relay coil 2FA, the circuit being from the running positive bus RPB, contacts 2FA2 (Fig. 2, part E), contacts a—b of CTS26, conductor 6, contacts a—b of CTS8 (Fig. 2, part C) through coil 1FA, to the negative main 1L1. It is apparent, therefore, that motor No. 1 is started with resistors 1R3—1R2 and 1R2—1R1 in circuit.

Energization of the brake relay coil 1Br (Fig. 2, part C) causes the opening of its contacts 1Br4 (Fig. 2, part E). This interrupts the positive side of the circuit of the relay coil 2T. Its contacts 2T1 and 2T2 therefore close in timed sequence. Consequently the accelerating contactor coils 11A and 12A are energized in timed sequence, closing contacts 11A1 and 12A1, short-circuiting the resistors 1R3—1R2 and 1R2—1R1 and connecting motor No. 1 across full voltage with forced fields. Under this condition the hoist speed is about 170 F. P. M.

The motor 1 continues to run at this speed until the single-motor transition point is reached in the limit switch. At this time contacts RS7 are unbridged by segment RS7. The energization of the accelerating contactor coil 12A had resulted in the opening of the contacts 12A4 (Fig. 2, part D), thereby deenergizing the time delay coil 3T. After a delay, contacts 3T1 (Fig. 2, part C) are opened, thereby deenergizing the relay coil 2FA. Deenergization of the relay coil 2FA results in the opening of contacts 2FA1, removing the short-circuit around the resistor D—E, thereby weakening the shunt field of motor No. 1. Deenergization of the relay coil 2FA also results in the opening of contacts 2FA2 (Fig. 2, part E), interrupting the energization of field relay coil 1FA. This causes the opening of contacts 1FA1, removing the shunt around the resistor C—D, further weakening the field of motor No. 1. The hoist is thus accelerated to its single-motor running speed, which may be in the neighborhood of 275 F. P. M.

The hoist operates at this running speed until the first slow-down point is reached. At this point the contacts RS2 of the limit switch are unbridged by the segment RS2. This opens the circuit of the first slow-down relay coil 1SD. Deenergization of the slow-down relay coil 1SD results in the closing of the contacts 1SD2 (Fig. 2, part C), causing field relay coil 2FA to be energized, closing the contacts 2FA1 (Fig. 2, part A), short-circuiting the field resistor D—E. Likewise, the deenergization of the slow-down relay coil 1SD results in the closing of the contacts 1SD1 (Fig. 2, part C), thereby energizing the field relay coil 1FA. The resulting closure of contacts 1FA1 short-circuits the resistor C—D (Fig. 2, part A). Thus the motor fields are forced and the hoist speed is reduced to about 170 F. P. M.

The deenergization of the first slow-down relay coil 1SD also causes the opening of the slow-down relay contacts 1SD6 (Fig. 2, part D), thereby deenergizing the accelerating contactor coils 11A and 12A, resulting in the opening of the contacts 11A1 and 12A1 (Fig. 2, part A), thereby inserting resistors 1R3—1R2, 1R2—1R1 in the armature circuit of the motors. The deenergization of the accelerating contactor coil 11A results in the closure of its auxiliary contacts 11A5 (Fig. 2, part D), completing the circuit for the armature shunting contactor coil 1AS (Fig. 2, part D), since the contacts 1SD7 are closed at this time. Energization of the shunting contactor coil 1AS results in the closure of contacts 1AS1 (Fig. 2, part A), placing resistor R10—R11 in armature shunting relationship with the armature of motor No. 1. This resistor, in combination with the series resistors 1R3—1R2, 1R2—1R1 reduces the armature voltage and hence the motor speed, causing the hoist to slow down to about 100 F. P. M. The hoist runs a short distance at this speed.

The slow-down check, effective with respect to single-motor operation, operates through the control transfer switch CTS4 to insure that the shunt fields have been strengthened by closure of the contacts 2FA3 responsive to the relay coil 2FA, and that the armature shunting contactor coil 1AS has been energized to close the contacts 1AS3.

When the second slow-down point is reached, contacts RS3 of the limit switch are bridged by the segment RS3, thereby energizing the relay coil 2SD, resulting in the closure of its contacts 2SD3 (Fig. 2, part D), resulting in the energization of the coil 2AS, causing the armature shunting contacts 2AS1 to close (Fig. 2, part A). These contacts 2AS1 add armature shunting resistor R12—R13 in parallel with the resistor R10—R11. This causes the hoist to slow down to about 70 F. P. M. When the limit of travel is reached in the upward movement of the right skip, the contacts RS5 of the limit switch are unbridged by the segment RS5, thereby opening the circuit of directional relay coil RSU. Deenergization of the directional relay coil RSU results in the opening of its contacts RSU2, deenergizing the directional contactor coils 1R and 12R, causing auxiliary contacts 11R2 to open, deenergizing the running positive bus RPB. This leads to setting the brakes and stopping the hoist.

*Single-motor operation from the hoist house*

As explained above, it is desirable at times to be able to operate the skip hoist in response to a master switch in the hoist house. This master switch, indicated in Figure 2, part E, by the character MS, should permit operation of the hoist in either direction for short increments of travel and at controlled speeds but only within safe limits of travel. This master switch MS is used, for example, when cables are taken up at the hoist drum or to spot the skips for oiling or for similar manipulation.

The illustrated embodiment of the present invention provides for this type of operation only with a single motor, which is adequate. Either motor may be employed. Assuming that motor No. 1 is to be used, knife switch 1KS will be closed and knife switch 2KS will be opened. Knife switch 3KS will be thrown upwardly and knife switch 4KS will be thrown downwardly. The knife switch of the field transfer switch FT2 will be thrown down. Control transfer switch CTS must be turned to the position "motor 1 hoist house."

The UV coil is energized by moving the hoist house master switch MS to its "off" position. The reset circuit passes from the positive main 1L2 through contacts b—a of CTS1 through the conductor C0 to the uppermost stage of the hoist house master switch MS, through contacts c—b, b—a of CTS21, thence through conductor C1 to UV coil (Fig. 2, part B), thence through contacts 220L1, etc., to negative main 1L1.

The maintaining circuit for the UV coil passes from the positive main 1L2 through contacts UVL, thence through the b—c contacts of CTS1 to the conductor C1, so that the skip stop (emergency stop) button SR1 (Fig. 2, part B) on the master panel in the stock house is effective even when the hoist house master switch MS is in use.

The skip hoist is started by moving the hoist house master switch MS to the left or right, according to which skip is to be hoisted. On the first point to the right a circuit is completed from the main 1L2 through stage No. 5 of the master switch MS (Fig. 2, part D) through the contacts c—b, b—a of CTS25, through conductor C5 to contacts *c—b* of CTS6 (Fig. 2, part B), thence through coil RSU to the negative main 1L1. Energization of the directional relay coil RSU results in the closure of the contacts RSU2, causing the energization of the directional contactor coils 11R and 12R, thereby closing contacts 11R2 and 21R2 (Fig. 2, part B), causing the energization of the running positive bus RPB.

On the first point of the master switch MS a circuit is completed from the running positive bus RPB through the contacts *b—a* of CTS7 (Fig. 2, part C), through conductor C12, through stage 2 of the master switch MS, through contacts *c—b* of CTS22 (Fig. 2, part E), through the conductor C2, through contacts *b—c* of CTS11 (Fig. 2, part C), through contacts 11A3, 12A3, coil 11P, contacts S2 and contacts *a—b* of CTS9 to the negative main 1L1. Coil 11P is thus energized and its contacts 11P1 (Fig. 2, part A) close, thereby connecting motor No. 1 in circuit. The circuit for coil 11P is maintained from the contacts *b—c* of CTS11 through the contacts *a—b* of CTS11 and 11P5 (Fig. 2, part C). In the "off" position and on the first point of the master switch MS a circuit is completed from the running positive bus RPB through the contacts *b—a* of CTS7 (Fig. 2, part C), through conductor C12, through stage 3 of the master switch MS, through contacts *c—b* of CTS23, through the conductor C3 (Fig. 2, part E), through the contacts *c—b* of CTS14 (Fig. 2, part C), and through the time delay relay coil 2T to the negative main 1L1. Energization of the coil 2T results in closure of its contacts 2T3 (Fig. 2, part C), energizing the brake relay coils 1Br and 2Br as soon as sufficient current flows in armature 1 to cause the series brake relay coil 11Br (Fig. 2, part A) to close its contacts 11Br1 (Fig. 2, part C). (Contacts 21Br1 are short-circuited by the contacts *b—c* of CTS10.) Energization of the coils 1Br and 2Br causes the closure of their contacts 1Br1 and 2Br1 (Fig. 2, part A), resulting in the energization of the brake coils BC5 and BC6.

On the first point of the master switch MS, connection is had from the running positive bus through CTS7 (Fig. 2, part C) and conductor C12 to the conductors C2, C6 and C7, through CTS22, CTS26 and CTS27, respectively. Conductor C2 leads to CTS17 and the field relay coil 3FA. Conductor C6 leads to CTS8 and to coil 1FA. Energization of the coils 3FA, 2FA and 1FA results in the closure of their contacts 3FA1, 2FA1 and 1FA1 (Fig. 2, part A), short-circuiting the resistors F—G, D—E and C—D, resulting in the forcing of the motor fields. On the first point of the master switch MS a circuit is completed from the running positive bus RPB through the contacts 11A5 and 22A5 (Fig. 2, part D), through the contacts *a—b* of CTS16, through coil 1AS, conductor C8, contacts *a—b—c* of CTS28, through stage 8 of the master switch MS, to conductor C13 and contacts *c—b* of CTS9 (Fig. 2, part C) to the negative main 1L1. Energization of the coil 1AS causes the closing of its contacts 1AS1 (Fig. 2, part A), introducing the resistor R10—R11 into shunting relationship with armature 1.

On the first point of the master switch MS a circuit is completed from the running positive bus RPB through CTS7 (Fig. 2, part C), and the conductor C12 to the master switch MS, thence through contacts *c—b—a* of CTS 29 to conductor C9, thence through contacts *a—b* of CTS15 (Fig. 2, part D), through coil 2AS and contacts 1AS2 to the negative main 1L1. Energization of the coil 2AS results in closure of the contacts 2AS1 (Fig. 2, part A), introducing the resistor R12—R13 in shunting relationship with armature 1.

Thus on the first point of the master switch MS the motor 1 starts with the resistors 1R3—1R2, 1R2—1R1 in circuit and with its armature shunted by resistors R10—R11 and R12—R13. The shunt fields are forced. Hence the hoist speed is a minimum, about 70 F. P. M.

On the second point of the master switch MS the circuit through the conductor C9 is opened. This leads to the deenergization of the contactor coil 2AS, opening its contacts 2AS1 (Fig. 2, part A), disconnecting the armature shunting resistor R12—R13 from circuit. The hoist speed therefore increases to about 100 F. P. M.

On the third point of the master switch MS the circuit through the conductor C8 is opened. This leads to the deenergization of the contactor coil 1AS, opening its contacts 1AS1 (Fig. 2, part A), disconnecting the armature shunting resistor R10—R11 from circuit. The hoist speed therefore increases.

On the fourth point of the master switch MS the circuit through the conductor C3 is opened. This causes the deenergization of the relay coil 2T leading to the closure of the auxiliary contacts 2T1 and 2T2 in timed sequence (Fig. 2, part D), thereby causing energization of the accelerating contactor coils 11A and 12A, resulting in the closing of their contacts 11A1 and 12A1 (Fig. 2, part A), cutting out the resistors 1R3—1R2, 1R2—1R1. The hoist speed therefore increases to about 170 F. P. M.

On the fifth point of the master switch MS the circuit through conductor C6 is opened. This causes the relay coil 1FA to be deenergized (Fig. 2, part C), opening its contacts 1FA1 (Fig. 2, part A), removing the short-circuit around the resistor C—D, causing an increase in speed.

On the sixth (last) point of the master switch MS the circuit through conductor C7 is opened. This causes the deenergization of the field relay coil 2FA (Fig. 2, part C), causing the opening of its contacts 2FA1 (Fig. 2, part A), removing the short-circuit around the resistor D—E, causing an increase to the full running speed of about 275 f. p. m. This action can take place only if the contacts 3T1 are open (Fig. 2, part C). These contacts, which are responsive to the relay coil 3T, open only after the single-motor transition point is reached (at which time the limit switch contacts RS7 are unbridged by the limit switch segment RS7) and only after the accelerating contactor coil 12A (Fig. 2, part D) has been energized to open its contacts 12A4 (Fig. 2, part D). Moreover, the relay involving the relay coil 3T interposes a suitable time delay between the energization of the coil 12A and the deenergization of the coil 2FA.

It has been stated hereinabove under the heading Single-motor operation from the stock house that according to the example chosen for illustration the maximum speed of the hoist when operating from the stock house with a single motor would approximate 275 f. p. m. This is substantially less than the normal operating speed when the hoist is driven by two motors.

Similarly, under the conditions now being discussed, that is—under control from the hoist house, the hoist will attain a maximum speed of about 275 f. p. m. when the hoist is operating with only one motor. The speed is restricted by the fact that contacts 3FA1 are closed throughout the skip trip when the hoist is being driven by a single motor. These contacts are held closed because of the fact that coil 3FA is energized throughout the skip trip. The energizing circuit when operating with a single motor in response to the hoist house master switch MS may be traced from the running positive bus RPB through contacts a—b of CTS7, through wire C12 to the hoist house master switch MS, thence through the master switch contacts MS2 and through contacts b—c of the control transfer switch CTS22, thence through wire C2 to and through the control transfer switch CTS17, thence through the coil 3FA, thence through contacts a—b of control transfer switch CTS9 to negative.

It will be noted that the hoist house master contacts MS2 are closed with the hoist master switch in any of its six positions for either direction of movement.

As above stated, the master switch MS is an article of commerce and the number of points for each direction of movement may be had within wide variations. Master switches of this type are readily available, having seven points for each direction of rotation as well as master switches having the six points indicated. In the event that a seven position switch is chosen, the seventh position would be identical with the sixth position except for the fact that at the seventh position contacts MS2 might be opened rather than closed. Stated in other words, the master switch MS would have the effect, in its seventh position for each direction of movement, of bridging only the contacts MS4 when the left skip is being hoisted and contacts MS5 when the right skip is being hoisted. With this arrangement the coil 3FA would be deenergized when the master switch MS is in its seventh position. This in turn would result in the opening of contacts 3FA1. This would introduce resistor FG into the shunt field circuit of the motor, thereby increasing the speed thereof. Thus it will be seen that it is an optional matter whether the hoist is operated at its full speed or at reduced speed when the hoist is driven by a single motor.

Return of the master switch MS from its sixth or seventh position to intermediate positions causes the hoist to reduce its speed to correspond to the point to which the master switch is moved.

It should be noted that even if the master switch is on point 3, 4, 5 or 6, arrival of the skip at the first slow-down position causes the relay coil 1SD to be deenergized by reason of the unbridging of the limit switch contacts RS2 by the limit switch segment RS2. Deenergization of the relay coil 1SD results in the closure of the contacts 1SD1 and 1SD2 (Fig. 2, part C), causing the energization of the field relay coils 1FA and 2FA. Also, the accelerating contactor coils 11A and 12A (Fig. 2, part D) are deenergized by reason of the opening of the auxiliary contact 1SD6 controlled by the coil 1SD. The armature shunting contacts 1AS1 are closed by reason of the energization of the coil 1AS resulting from the closure of the contacts 1SD7 (Fig. 2, part D) responsive to the coil 1SD. Hence the speed is reduced to that corresponding to the second point of the master switch MS.

At the "slow-down check" point, when the limit switch contacts RS4 are unbridged by the limit switch segment RS4, the hoist is stopped unless the field relay coil 2FA and the armature shunting contactor coil 1AS are energized and their respective contacts 2FA3 and 1AS3 are closed. At the second slow-down point the limit switch contacts RS3 are bridged by the limit switch segment RS3. This leads to the energization of the relay coil 2SD (Fig. 2, part D), resulting in the closure of its contacts 2SD3 (Fig. 2, part D), causing the energization of the coil 2AS, closing its contacts 2AS1 (Fig. 2, part A), thereby completing the armature shunting circuit through the resistor R12—R13. The hoist speed is thus reduced to about 70 f. p. m.

At the final stop position the limit switch contacts RS5 are unbridged by the limit switch segment RS5, thereby opening the circuit of the directional body relay coil RSU (Fig. 2, part B). This leads to stoppage of the hoist, as previously described.

*Speed regulation characteristics*

It is essential to the proper operation of the hoist that when the two motors are operating in parallel they will divide the load substantially equally. To this end it is necessary that the motors have a substantially drooping speed characteristic. It is generally an inherent characteristic of shunt-wound motors, particularly when equipped with inter-poles, as is the case with commercial motors of a type suitable for this hoist duty, that the speed regulation is rather flat, or that the speed may even tend to rise with increase in load when the fields are weakened. It will be evident that such a characteristic would not be preferred in the motors according to the present invention.

According to the illustrated embodiment of the present invention the motors are equipped with the series field windings designated as "Stab. Fld. 1" and "Stab. Fld. 2" associated with motors 1 and 2, respectively. These are cumulative compound windings which function to give the motors drooping speed characteristics adequate to insure satisfactory parallel operation both under weakened field conditions and under partially weakened field conditions. It is desirable, however, that when the motors are operated in series, the speed regulation be as flat as possible in order that the same dumping speed may be obtained when handling a load of ore and when handling a load of coke. It is also desirable that the dumping speed be maintained at a uniform value while the upper skip capsizes and while the effectiveness of its own weight and the weight of its contents therefore diminishes, causing a substantial change in the torque requirement of the drive. It is desirable under these conditions that the compounding effect of the series windings be eliminated, in order that the motors may have flat speed characteristics. This is accomplished by locating the bridge circuit through the contactor S1 connecting the armatures of two motors in series in such manner that the series fields are not included in circuit. Hence the motors operate in series as shunt motors, and they operate in parallel as compound-wound or stabilized motors.

A practical advantage of the above described embodiment of the present invention may be described as follows:

For practical operation, a speed range of approximately 5 to 1 is desirable between the high running speed of the hoist and the slowest running speed thereof. Of this range an approximately 2 to 1 speed range is accomplished by the change from series to parallel arrangement of the motors. This range is multiplied approximately 2 to 1 by the field forcing and field weakening arrangement. This accomplishes approximately a 4 to 1 speed ratio. This 4 to 1 speed ratio is supplemented by the control using the main circuit resistors (in series and in shunt) with the motor armatures, to multiply this speed range by a factor of approximately 1.25 to 1. This is accomplished in a single step, reducing the speed below the speed attained with the motors connected in series and with their fields forced.

*Stoppage of hoist upon opening of a contactor*

When the hoist is operating normally, with two motors in series, the armature circuit includes contactors 11R1 and 12R1 (or 11L1 and 12L1) contactor S1 and contactors 21R1 and 22R1 (or 21L1 and 22L1). When two motors are operating in parallel, the armature circuits include the above mentioned directional contactors and paralleling contactors 11P1 and 22P1.

If the closing coil of directional contactor 11R should fail, causing contacts 11R1 to open, auxiliary contacts 11R2 (Fig. 2, part B) would also open. The running positive bus RPB would thus be deenergized, leading to stoppage of the hoist. Likewise if the closing coil of directional contactor 21R should fail, contacts 21R2 would open. Contactor 12R may be mechanically interlocked with contactor 11R so that opening of contactor 12R causes contactor 11R to open, thereby opening contacts 11R2. Similarly, contactor 22R may be mechanically interlocked with contactor 21R. Thus if any of the directional contactors opens while the hoist is in operation, the hoist will be stopped and the brakes will be caused to set.

If the series contactor S should open while the motors are operating in series, thus opening contacts S1, auxiliary contacts S5 (Fig. 2, part C) will also be opened. This leads to the opening of the brake relays 1Br and 2Br, causing the brakes to set.

If one of the paralleling contactors 11P or 22P should open while the two motors are operating in parallel, auxiliary contacts 11P4 or 22P4 (Fig. 2, part C) would open, thereby leading to setting the brakes and stoppage of the hoist.

Thus it will be seen that, in normal operation, if any contactor essential to maintain continuity to an armature circuit opens, due to failure of a coil or for some other reason, the hoist is stopped by setting the brakes.

It should be further noted that the contacts 1Br1 and 2Br1 open the circuit of brake coils BC5 and BC6 on both the positive and negative sides. Furthermore, the circuits of the brake relay coil 1Br and 2Br are interrupted on one side of the circuit by contacts 11R2 and 21R2 and on the other side by contacts S5 (or 11P4—22P4). It is therefore quite impossible for the brakes to be held open due to a ground in the circuit of the brake coils BC5—BC6 or in the circuit of the brake relays 1Br—2Br.

Though a preferred embodiment of the present invention has been described in detail, many modifications will occur to those skilled in the art. It is intended to cover all such modifications that fall within the scope of the appended claims.

What is claimed is:

1. In a skip hoist, in combination, winding drum means having cables attached thereto adapted to be connected to a pair of skips, a pair of driving motors for said drum means, each of said motors being provided with a shunt winding and with a stabilizing series field winding, and control means for said motors for connecting said motors in parallel with said stabilizing windings in circuit or connecting said motors in series with said stabilizing windings out of circuit.

2. Drive means for a double-skip hoist comprising a pair of electric motors, each having a shunt field winding and a stabilizing series field winding, control means for said motors for selectably connecting said motors in parallel or in series, and means for forcing said field windings and for weakening said field windings for controlling the speed of said motors.

3. In a double-skip hoist, in combination, winding drum means, a pair of motors for driving said winding drum means, control means for connecting said motors in series for starting purposes and in parallel for running purposes, said control means including means for controlling the speed of said motors by weakening or strengthening the fields thereof, each of said motors being provided with a stabilizing series field winding, said control means including means for connecting said series field windings in circuit with said motors for parallel operation and for removing said series field windings from the circuit of said motors for series operation.

4. In a double-skip hoist, in combination, winding drum means, a pair of motors, control means for said motors including means for connecting said motors in series or in parallel, said control means also including means for controlling the speed of said motors by weakening or strengthening the fields thereof, said control means also including means for controlling each of said motors to the exclusion of the other.

5. In a double-skip hoist, in combination, a pair of motors each having a shunt winding and each having a stabilizing series winding, means for connecting said motors in parallel with said series field windings in circuit or for connecting said motors in series with said series field windings out of circuit, means for controlling the speed of said motors by forcing or weakening the fields thereof, and control switch means adapted upon initiation of operations to carry through the changes in said control means throughout a cycle of movement in one direction of either of the skips of said double-skip hoist.

6. In a double-skip hoist, in combination, a pair of motors each having a shunt winding and each having a stabilizing series winding, means for connecting said motors in parallel with said series field windings in circuit or for connecting said motors in series with said series field windings out of circuit, means for controlling the speed of said motors by forcing or weakening the fields thereof, control switch means adapted upon initiation of operations to carry through the changes in said control means throughout a cycle of movement in one direction of either of the skips of said double-skip hoist, limit switch means for limiting the operation of said motors, and auxiliary switch means for controlling the operation of either of said motors within the limits prescribed by said limit switch means.

7. In a skip hoist, in combination, a pair of motors each having a shunt winding and a stabilizing series winding, control means for said motors, said control means including control switch means adapted upon initiation of operations to carry through predetermined changes in said control means throughout a cycle of movement in one direction of said motors, said control means including means for selectably connecting said motors in series or in parallel and for selectably forcing or weakening the shunt field windings of said motors.

8. In a skip hoist, in combination, a pair of motors each having a shunt winding and a stabilizing series winding, control means for said motors, said control means including control switch means adapted upon initiation of operations to carry through predetermined changes in said control means throughout a cycle of movement in one direction of said motors, said control means including means for selectively connecting said motors in series or in parallel and for selectably forcing or weakening the shunt field windings of said motors, and resistors responsive to said control switch means adapted to be thrown in series or in shunt with the armatures of said motors for controlling the speed thereof.

9. In a skip hoist, in combination, a pair of motors each having a shunt winding, main circuit resistors adapted to be connected in series or in shunt with the armatures of said motors, and control switch means for controlling the speed of movement of said motors throughout the range of movement of said motors for skip movement in one direction, said control switch means being adapted to connect said motors selectably in series or in parallel, to vary the strength of the shunt fields of said motors, and to control the series or shunt relationship of said resistors with said motor armatures.

10. In a skip hoist, in combination, a pair of motors each having a shunt winding, main circuit resistors adapted to be connected in series or in shunt with the armatures of said motors, control switch means for controlling the speed of movement of said motors throughout the range of movement of said motors for skip movement in one direction, said control switch means being adapted to connect said motors selectably in series or in parallel, to vary the strength of the shunt fields of said motors, and to control the series or shunt relationship of said resistors with said motor armatures, and means for modifying said control switch means for controlling one of said motors to the exclusion of the other motor and to control said resistors consistently with single-motor operation.

11. In a skip hoist, in combination, a pair of motors each having a shunt winding and a stabilizing series winding, resistors adapted to be connected in series or in shunt with the armatures of said motors, control means for said motors adapted to carry through a predetermined sequence of speed changes throughout a predetermined range of movement of said motors, limit switch means for determining the limits of such movement, said control means including means for insuring the starting of said motors with weak fields followed by the gradual building up of a strong torque for starting purposes, said control means including means for connecting said motors selectably in parallel or in series and for varying the strength of the fields thereof.

12. In a skip hoist, in combination, a pair of motors each having a shunt winding and a stabilizing series winding, resistors adapted to be connected in series or in shunt with the armatures of said motors, control means for said motors adapted to carry through a predetermined sequence of speed changes throughout a predetermined range of movement of said motors, limit switch means for determining the limits of such movement, said control means including means for insuring the starting of said motors with weak fields followed by the gradual building up of a strong torque for starting purposes, said control means including means for connecting said motors selectably in parallel or in series and for varying the strength of the fields thereof and for connecting said resistors in series or in shunt with said motor armatures for speed control purposes.

13. In a skip hoist, in combination, a pair of motors each having a shunt winding and a stabilizing series winding, resistors adapted to be connected in series or in shunt with the armatures of said motors, control means for said motors adapted to carry through a predetermined sequence of speed changes throughout a predetermined range of movement of said motors, limit switch means for determining the limits of such movement, said control means including means for insuring the starting of said motors with weak fields followed by the gradual building up of a strong torque for starting purposes, said control means including means for connecting said motors selectably in parallel or in series and for varying the strength of the fields thereof and for connecting said resistors in series or in shunt with said motor armatures for speed control purposes, and master switch means for controlling the operation of one of said motors to the exclusion of the other, said master switch means including means for governing said resistors consistently with single-motor operation.

14. In a skip hoist, in combination, a pair of motors each having a shunt winding, main circuit resistors, control means for said motors including means for selectably connecting said motors in series or in parallel, said control means cooperating with said resistors to effect said transition without open-circuiting said motors, said control means including means for selectably weakening or strengthening the shunt fields of said motors for speed control purposes.

15. In a skip hoist, in combination, a pair of motors each having a shunt winding, main circuit resistors, control means for said motors including means for selectably connecting said motors in series or in parallel, said control means cooperating with said resistors to effect said transition without open-circuiting said motors, said control means including means for selectably weakening or strengthening the shunt fields of said motors for speed control purposes, said control means including means for operating either of said motors to the exclusion of the other and for modifying the effect of said resistors consistently with single-motor operation.

16. In a skip hoist, in combination, a pair of motors each having a shunt winding and a series field winding, control means for said motors for carrying through a predetermined cycle of speed changes in said motors by selectably connecting said motors in series or in parallel arrangement and selectably varying the strength of the shunt fields of said motors, said control means including means for controlling either of said motors independently of the other.

17. In a skip hoist, in combination, a pair of motors each having a shunt winding and a series field winding, control means for said motors for carrying through a predetermined cycle of speed changes in said motors by selectably connecting said motors in series or in parallel arrangement and selectably varying the strength of the shunt fields of said motors, said control means including means for controlling either of said motors independently of the other, limit switch means for controlling the range of movement of said motors in either direction, and master switch means for controlling either of said motors independently of the other at predetermined speeds within the limitations set by said limit switch means.

18. In a skip hoist, in combination, a pair of motors each having a shunt winding and a stabilizing series winding, control means for said motors for selectably connecting said motors in series or parallel relationship with each other and for varying the field strength of said motors, and means for reducing the speed of said motors in case of tendency to overspeed.

19. In a skip hoist, in combination, a pair of motors each having a shunt winding and a stabilizing series winding, control means for said motors for selectably connecting said motors in series or parallel relationship with each other and for varying the field strength of said motors, and means for reducing the speed of said motors in case of overload.

20. In a skip hoist, in combination, a pair of motors each having a shunt winding and a stabilizing series winding, control means for connecting said motors selectably in series or parallel relationship and for field forcing and field weakening said motors, main circuit resistors, said control means including armature shunting contactors for controlling the connections of said resistors consistently with two-motor or single-motor operation.

21. In a skip hoist, in combination, a pair of motors, control means adapted selectably to connect said motors in series or in parallel relationship, said control means including a plurality of contactors, certain of said contactors being connected in series with one or both of the armatures of said motors, and means for stopping said motors in the event of an interruption in the continuity of said armature circuits.

22. In a skip hoist, in combination, a pair of motors each having a shunt winding, control means for connecting said motors selectably in series or parallel relationship and for varying the strength of the shunt fields of said motors, said control means including means for operating either one of said motors singly to drive the hoist at reduced speed, said last mentioned means being adapted to control the shunt field strength of said one motor.

23. In a skip hoist, in combination, a pair of motors, control means for connecting said motors selectably in series or parallel relationship, control means for said motors adapted to carry through a predetermined range of movement of said two motors conjointly, means to modify both of said control means whereby one of said motors may carry through a similar range of movement, and start switch means, the control means in both instances being responsive to the said start switch means.

24. In a skip hoist, in combination, a pair of motor, start switch means, control means for connecting said motors selectably in series or parallel relationship, control means adapted to carry through a predetermined range of movement of said two motors in response to said start switch means, master switch means, and means to modify both of said control means whereby one of said motors operates selectably in response to said start switch means or in response to said master switch means.

25. In a skip hoist, in combination, a pair of motors, control means for controlling the operation of said motors in combination, means for modifying said control means for controlling one of said motors alone, start switch means, and master switch means, said modifying means including means whereby the control responds selectably to said start switch means or to said master switch means.

26. In a skip hoist, in combination, a pair of motors, start switch means, control switch means and limit switch means adapted for operation on a constant potential direct current and adapted in response to said start switch means to carry through predetermined changes in said control switch means for operation of the two motors throughout a cycle of movement in one direction, master switch means, and means to modify said control switch means whereby either motor may operate singly to the exclusion of the other in response to said start switch means, or selectably in response to said master switch means.

27. In a skip hoist, in combination, a pair of skips, a pair of motors for driving said skips, control switch means for connecting said motors selectably in series or in parallel, limit switch means to control the cycle of movement of said motors, and other limit switch means to prevent operation of the two motors in parallel near the limits of travel of said skips.

28. In a skip hoist, in combination, motive means, control switch means for governing a cycle of operation of said motive means, said control switch means including limit switch means for slowing down the movement of said motive means near the limit of travel thereof, and other limit switch means to stop said motive means in the event that said control switch means fails to respond to said first-mentioned limit switch means.

29. In a skip hoist, in combination, a pair of motors, means including contactors for connecting said motors selectably in series or in parallel relationship, control means for said motors adapted to carry through a predetermined range of movement of said two motors, said control means including means for insuring that said motors will be stopped in the event that any of said contactors necessary for said series or parallel relationship should open or fail to close in the performance of its function of providing either of said relationships.

30. Drive means for a skip hoist including a pair of motors, each of said motors being provided with a shunt field winding, and control means for selectively connecting said motors in series or in parallel to vary their speed of operation, said control means being also provided with means for varying the strength of said shunt fields of said motors in unison whereby further to increase the range of speed variation of said motors.

31. In a skip hoist, in combination, winding drum means, a pair of motors for driving said winding drum means, each of said motors being provided with a shunt field winding, and control means for connecting said motors selectively in series or in parallel and for causing transition from one of said connections to the other to provide variations in speed of said motors, said control means being also provided with means for varying the strengths of the shunt fields of said motors further to increase the range of speed variation of said motors.

32. In combination, a pair of motors, each provided with a shunt field winding, and control means for connecting said motors in series for starting and for slow speed running conditions and in parallel for high speed running conditions, said control means being adapted to effect the transition from series connection to parallel connection and reversal without open-circuiting said motors, said control means including means for further controlling the speeds of said motors by simultaneously weakening or strengthening said shunt field windings of said motors.

33. In a skip hoist, in combination, a pair of motors each having a shunt winding, control means for connecting said motors selectably in series or in parallel relationship and for varying the strength of the shunt fields of said motors, said control means including means for operating either one of said motors singly to drive said hoist, said means for varying the strength of said shunt fields being adapted to control the operating speed of said hoist when said hoist is driven by a single motor.

GORDON FOX.